(12) United States Patent
Bamford et al.

(10) Patent No.: US 9,132,918 B2
(45) Date of Patent: Sep. 15, 2015

(54) SEATING ARRANGEMENT, SEAT UNIT, TRAY TABLE AND SEATING SYSTEM

(75) Inventors: Victoria Anne Bamford, Auckland (NZ); Glen Wilson Porter, Chrislchurch (NZ); James Dominic France, Auckland (NZ); Geoffrey Glen Suvalko, Auckland (NZ)

(73) Assignee: AIR NEW ZEALAND LIMITED, Auckland (NZ)

( * ) Notice: Subject to any disclaimer, the term of this patent is extended or adjusted under 35 U.S.C. 154(b) by 749 days.

(21) Appl. No.: 13/055,890

(22) PCT Filed: Jan. 25, 2010

(86) PCT No.: PCT/IB2010/050324
§ 371 (c)(1),
(2), (4) Date: Jun. 13, 2011

(87) PCT Pub. No.: WO2010/086785
PCT Pub. Date: Aug. 5, 2010

(65) Prior Publication Data
US 2011/0226900 A1    Sep. 22, 2011

Related U.S. Application Data

(60) Provisional application No. 61/202,127, filed on Jan. 30, 2009, provisional application No. 61/267,608, filed on Dec. 8, 2009.

(51) Int. Cl.
*B64D 11/06* (2006.01)
*A47C 7/50* (2006.01)
*B61D 33/00* (2006.01)
(Continued)

(52) U.S. Cl.
CPC .......... *B64D 11/0641* (2014.12); *B60N 2/4495* (2013.01); *B60N 3/004* (2013.01); *B61D 1/02* (2013.01); *B61D 33/00* (2013.01); *B64D 11/0638* (2014.12); *B64D 11/0643* (2014.12); *Y02T 30/30* (2013.01)

(58) Field of Classification Search
CPC .......... B64D 11/0638; B64D 11/0641; B64D 11/0643; B64D 1/02; B60N 2/4495
USPC ................ 244/118.6; 296/65.01; 297/423.28, 297/423.32, 188.05; 105/314, 345
See application file for complete search history.

(56) References Cited

U.S. PATENT DOCUMENTS 246,082 A    8/1881    Coffin
257,862 A    5/1882    Gregg
(Continued)

FOREIGN PATENT DOCUMENTS

AU    745388    5/2000
CA    2577365    3/2006
(Continued)

*Primary Examiner* — Rob Swiatek
(74) *Attorney, Agent, or Firm* — Dann, Dorfman, Herrell and Skillman, P.C.

(57) ABSTRACT

A row of a plurality of adjacent seats supported by a support frame. The seat includes a seat back, a seat pan and a leg rest. The leg rest of each seat includes a leg support surface and is mounted relative to the seat frame in a manner to allow it to move between (a) a stored condition and (b) a fully deployed condition where the seat pan and the leg rest support surface are substantially coplanar. The leg rest and seat pan of each seat in the row can cooperate to define a reconfigurable horizontal support surface for at least one passenger.

52 Claims, 33 Drawing Sheets

(51) Int. Cl.
*B60N 2/44* (2006.01)
*B60N 3/00* (2006.01)
*B61D 1/02* (2006.01)

(56) References Cited

U.S. PATENT DOCUMENTS

| | | | |
|---|---|---|---|
| 655,892 A | 8/1900 | Strauss | |
| 964,540 A | 7/1910 | Niemeyer et al. | |
| 1,182,830 A | 5/1916 | Woicula | |
| 1,401,177 A | 12/1921 | Mitchell | |
| 1,995,416 A | 3/1935 | Carcanagues | |
| 2,081,529 A | 5/1937 | Canney | |
| 2,124,003 A | 7/1938 | McDonnell et al. | |
| 2,163,198 A | 6/1939 | Gossard | |
| 2,270,557 A | 1/1942 | Randall | |
| 2,280,065 A | 4/1942 | De Roode | |
| 2,310,573 A | 2/1943 | Burton | |
| 2,608,366 A * | 8/1952 | Jergenson | 244/118.6 |
| 2,719,066 A | 9/1955 | Budzinski | |
| 2,796,111 A | 6/1957 | Janczyszyn | |
| 2,886,831 A | 5/1959 | Duner | |
| 3,208,407 A | 9/1965 | Maskew | |
| 3,570,024 A | 3/1971 | Griffin | |
| 3,600,725 A | 8/1971 | McCartney | |
| 3,773,381 A | 11/1973 | Brennan | |
| 3,898,704 A | 8/1975 | Gallaher et al. | |
| 4,071,210 A | 1/1978 | Mutke | |
| 4,113,311 A | 9/1978 | Reida | |
| 4,410,215 A | 10/1983 | McKean et al. | |
| 4,440,439 A | 4/1984 | Szabo | |
| 4,526,421 A | 7/1985 | Brennan et al. | |
| 4,533,175 A | 8/1985 | Brennan | |
| 4,589,612 A | 5/1986 | Halim | |
| 4,674,713 A | 6/1987 | Ryan et al. | |
| 5,092,652 A | 3/1992 | Macaluso | |
| 5,133,587 A | 7/1992 | Hadden, Jr. | |
| 5,178,345 A | 1/1993 | Peltola et al. | |
| 5,335,882 A | 8/1994 | Bonacci | |
| 5,383,704 A | 1/1995 | Granados et al. | |
| 5,443,018 A | 8/1995 | Cromwell | |
| 5,447,359 A | 9/1995 | Asbjornsen et al. | |
| 5,474,359 A | 12/1995 | Muffi | |
| 5,611,503 A | 3/1997 | Brauer | |
| 5,695,240 A | 12/1997 | Luria | |
| 5,716,026 A | 2/1998 | Pascasio et al. | |
| 5,740,989 A | 4/1998 | Daines | |
| 5,894,616 A | 4/1999 | Graham et al. | |
| 6,056,239 A | 5/2000 | Cantu et al. | |
| 6,155,519 A | 12/2000 | Rajasingham | |
| 6,173,921 B1 | 1/2001 | Neumann et al. | |
| 6,237,872 B1 | 5/2001 | Bar-Levav | |
| 6,237,994 B1 | 5/2001 | Bentley et al. | |
| 6,250,716 B1 | 6/2001 | Clough | |
| 6,305,644 B1 | 10/2001 | Beroth | |
| 6,439,636 B1 | 8/2002 | Kuo | |
| 6,454,349 B1 | 9/2002 | Konya | |
| 6,481,798 B2 | 11/2002 | Romca et al. | |
| 6,550,861 B1 | 4/2003 | Williamson | |
| 6,588,848 B2 | 7/2003 | Cheng | |
| 6,669,143 B1 | 12/2003 | Johnson | |
| 6,692,069 B2 | 2/2004 | Beroth et al. | |
| 6,793,282 B2 | 9/2004 | Plant et al. | |
| 6,811,219 B2 | 11/2004 | Hudswell et al. | |
| 6,835,068 B2 | 12/2004 | Pappas et al. | |
| 7,070,149 B2 | 7/2006 | McDonnell | |
| 7,120,953 B2 | 10/2006 | Ferber et al. | |
| 7,201,448 B2 | 4/2007 | Williamson et al. | |
| 7,252,340 B2 * | 8/2007 | Johnson | 297/452.29 |
| 7,306,282 B2 | 12/2007 | Salzer et al. | |
| 7,419,214 B2 * | 9/2008 | Plant | 297/245 |
| 7,520,469 B2 | 4/2009 | Baumann | |
| 7,665,693 B2 | 2/2010 | Bettell | |
| 7,841,659 B2 | 11/2010 | Thompson | |
| 2002/0109389 A1 | 8/2002 | Satoh | |
| 2003/0071507 A1 | 4/2003 | Sankrithi | |
| 2003/0094837 A1 | 5/2003 | Williamson et al. | |
| 2003/0111888 A1 | 6/2003 | Brennan | |
| 2004/0007910 A1 | 1/2004 | Skelly | |
| 2004/0021349 A1 | 2/2004 | Longtin et al. | |
| 2004/0031883 A1 * | 2/2004 | Schmidt | 244/122 R |
| 2004/0051003 A1 | 3/2004 | Cheung | |
| 2004/0080201 A1 | 4/2004 | Verny et al. | |
| 2005/0194828 A1 | 9/2005 | Johnson et al. | |
| 2006/0181105 A1 | 8/2006 | Puschmann | |
| 2007/0018494 A1 | 1/2007 | Gutosky, Jr. | |
| 2007/0040434 A1 | 2/2007 | Plant | |
| 2007/0138848 A1 | 6/2007 | Schurg et al. | |
| 2007/0145791 A1 | 6/2007 | Strasser | |
| 2007/0170311 A1 | 7/2007 | Schuld et al. | |
| 2007/0262635 A1 | 11/2007 | Johnson | |
| 2007/0267543 A1 | 11/2007 | Boren et al. | |
| 2007/0283855 A1 | 12/2007 | Pozzi | |
| 2008/0093502 A1 | 4/2008 | Bettell | |
| 2008/0116731 A1 | 5/2008 | Schurg et al. | |
| 2008/0290715 A1 | 11/2008 | Fullerton et al. | |

FOREIGN PATENT DOCUMENTS

| | | |
|---|---|---|
| DE | 19939432 | 3/2000 |
| EP | 385861 | 9/1990 |
| EP | 0850834 | 7/1998 |
| EP | 1078852 | 2/2001 |
| EP | 1172252 | 1/2002 |
| EP | 1683719 | 7/2006 |
| GB | 2288728 | 11/1995 |
| GB | 2292676 | 3/1996 |
| GB | 2331454 | 5/1999 |
| GB | 2362095 | 11/2001 |
| GB | 2442386 | 4/2008 |
| GB | 2444700 | 6/2008 |
| WO | 9503969 | 2/1995 |
| WO | 0002745 | 1/2000 |
| WO | 0154941 | 8/2001 |
| WO | 03013903 | 2/2003 |
| WO | 03064207 | 8/2003 |
| WO | 2004024491 | 3/2004 |
| WO | 2005095210 | 10/2005 |
| WO | 2006021766 | 3/2006 |
| WO | 2006041417 | 4/2006 |
| WO | 2006093072 | 9/2006 |
| WO | 2007100662 | 9/2007 |
| WO | 2007128978 | 11/2007 |
| WO | 2008081059 | 7/2008 |
| WO | 2008143249 | 11/2008 |
| WO | 2010086785 | 8/2010 |

* cited by examiner

SEATING ARRANGEMENT, SEAT UNIT, TRAY TABLE AND SEATING SYSTEM

CROSS REFERENCE TO RELATED APPLICATIONS

This application is a U.S. National Phase of International Application No. PCT/IB2010/050324 filed Jan. 25, 2010 which designates the United States and claims the benefit of prior U.S. Provisional Application No. 61/202,127, filed Jan. 30, 2009 and prior U.S. Provisional Application No. 61/267,608, filed Dec. 8, 2009. The entire disclosures of said applications are incorporated herein by reference.

FIELD OF INVENTION

The present invention relates to seats and seating arrangements in or for a vehicle, particularly but not solely for an aircraft.

BACKGROUND

Seats onboard commercial passenger aircraft come in many different configurations. Indeed, many aircraft carry a number of different types of seats. For example they may carry a number of business class seats, and usually a larger number of economy class seats.

The standard price of a business class seat is higher than an economy class seat. This is primarily because a business class seat takes up much more floor space of the aircraft. Airlines may hence charge a premium for such seats.

Many business class seats now offer the ability for the seat to be reclined from a sedentary position to a fully lay flat position. In the lay flat position, the seat back, seat pan and for example an ottoman end up in a relationship with each other that presents a substantially flat surface. This allows a passenger to lie down and hence be more comfortable when resting or sleeping. WO 03/013903 (Virgin Atlantic Airways Ltd) shows such a seat. US 2007/0040434 also shows a seat that can achieve this. However such seats consume a large footprint onboard the aircraft in order to offer one passenger such comforts. This means that there is less passenger density in a business seat class section of an aircraft.

The usual trade-off for airlines in offering passengers increased comfort is a reduction in passenger density. This is because comfort for a passenger is usually achieved by providing more personal space onboard the aircraft for that passenger. This usually reduces the number of passengers that can be carried by an aircraft. This is the primary reason why airlines charge more for business class seats compared to economy class seat. It may be argued that a reduced payload (e.g. number of passengers and their luggage) may result in fuel savings. However, the mechanisms of business class seats are usually complex and expensive and heavy. This offsets at least to some extent, any such fuel saving.

Economy class seats on long-haul flights are known to be used in manner that can allow a passenger to lie down. The armrests between seats in a row of seats may be able to be folded out of the way. When lying down, only one passenger then occupies that entire row by lying across all the seatpans of the seats in that row. This can usually only occur where the flight is not full as all the seats in that row may then be occupied by only one passenger.

Some airlines currently focus on trying to maximise an individual passengers comfort and personal space and also strive to isolate and insulate that passenger from other passengers as much as possible. Passengers are treated as individuals but on many flights, passengers travel as a group of people such as a family. They may want to interact with each other and feel comfortable resting in close quarters to each other. Or they may at least want the options for such.

Making an individual seat less individualised and more communal is counterintuitive to what the airline industry is currently trying to achieve. The seats do not allow for cooperation with each other. Indeed in business class, and in many other classes, cooperation is not a design factor because it usually means a loss of privacy.

Furthermore some groups of travelers may not be able to afford business class or cannot justify spending money on the price of business class tickets. For example where a family is traveling with young children who do not benefit from the extra space offered in business class, the parents will find it harder to justify a business class ticket.

Whilst airlines are cautious about offering seats in a lower class on a basis that it may cannibalize the sale of seats in another class, there has been a significant amount of seat development work done to offer space and privacy and comfort and service for business class. This has increased the separation of these qualities between business class and economy class because of the focus on business class seat development over economy class. There has generally been a lack of development in economy class seating to offer an increase is such qualities. Inflight entertainment systems, being an obvious exception to this.

Passenger seating technology in aircraft has necessarily developed as a separate technical field to that in other modes of transportation due to the significant technical, cost and spacing restraints which are unique to aircraft applications.

It is therefore an object of the present invention to provide a seat and/or seating arrangement that is reconfigurable to offer a multifunctional zone that can promote shared use of a defined space by multiple passengers.

As used herein the term "and/or" means "and" or "or", or both.

As used herein "(s)" following a noun means the plural and/or singular forms of the noun.

"contiguous" as used herein may be interpreted as being an abutting and contacting relationship or a non abutting relationship where a small but negligible gap may exist.

"window seat" as used herein denotes a seat of a row that is closest to the cabin wall adjacent the fuselage, whether there is physically a window adjacent that seat or not.

BRIEF DESCRIPTION OF THE INVENTION

In a first aspect the present invention may broadly be said to be a passenger vehicle seat unit comprising:
  a row of a plurality of adjacent seats, each including a seat back, a seat pan and a leg rest supported by a support frame, the leg rest of each seat moveably mounted relative to the support frame in a manner to allow it to move between (a) a stored condition and (b) a fully deployed condition where the seat pan and the leg rest are substantially coplanar, and
  wherein the leg rest and seat pan of each seat in the row can cooperate to define a reconfigurable horizontal support surface for at least one passenger.

Preferably the leg rest and seat pan of each seat in the row can cooperate to define a reconfigurable support surface for shared use by at least two passengers.

Preferably the row comprises at least two adjacent seats and wherein the leg rest and seat pan of each seat in the row can cooperate to define a reconfigurable support surface for shared use by all of the at least two passengers assigned to the row.

Preferably the row comprises three adjacent seats.

Preferably the row comprises four adjacent seats.

Preferably the row comprises five adjacent seats.

Preferably for each seat, the leg rest extends from adjacent the seat pan and in the seat facing direction when in the fully deployed condition.

Preferably for each seat the leg rest is contiguous the seat pan when in the fully deployed condition.

Preferably extends from adjacent the seat pan and in a downward direction when in the stored condition.

Preferably for each seat the leg rest is contiguous the seat pan when in the stored condition.

Preferably when in a fully deployed condition, the leg rest of adjacent seats are Preferably when in a stored condition, the leg rest of adjacent seats are contiguous each other.

Preferably all seats of the row are side by side and all face in the same direction.

Preferably the row includes three seats and wherein all the leg rests and seats pans of said three seats are able to be configured to
  i) define a horizontal passenger support surface that can assume each of a T-shape, L-shape and U-shape and I-shape when viewed in plan view, and
  ii) allow all three leg rests, in their fully deployed condition, together with the seat pans to support at least one person in a reclined position.

Preferably the row includes four seats and wherein all the leg rests and seats pans said three seats are able to be configured to
  i) define a horizontal passenger support surface that can assume each of a T-shape, L-shape and U-shape and I-shape when viewed in plan view, and
  ii) allow all four leg rests, in their fully deployed condition, together with the seat pans to support at least one person in a reclined position.

Preferably flanking each side of each seat in the row, is an armrest, the arm rest intermediate of two seats in the row being able to move between a usable position wherein it is positioned intermediate of the seatback and seat pan and a stowed position wherein it is not positioned intermediate of the seatback and seat pan.

Preferably in the stowed position each arm rest intermediate of two adjacent seats, is located in a cavity defined between the backrests of the two adjacent seats.

Preferably at least one armrest located at the end of the row is able to move between a usable position wherein it is positioned intermediate of the seatback and seat pan and a stowed position wherein it is not positioned intermediate of the seatback and seat pan.

Preferably at least the or each arm rest intermediate of two adjacent seats is movable in a pivotable manner relative the support frame between stored and useable positions.

Preferably the arm rest between two adjacent seats, when in said stowed position, is positioned set back from the facing surfaces of the back rests of adjacent seat.

Preferably each leg rest can be held in a position intermediate of the fully deployed and stowed conditions.

Preferably the support frame supports all seats of said row.

Preferably the backrest of each seat can move between an upright position and a reclined position.

Preferably each said leg rest is supported solely by the support frame.

Preferably each said leg rest can be moved to and be held at a partially deployed position that is intermediate of the fully deployed and stowed conditions.

Preferably the passenger vehicle seating unit as herein above described is installed onboard a commercial passenger aircraft.

Preferably the passenger vehicle seating unit as herein above described is installed in an economy class section of the aircraft.

Preferably the passenger vehicle seating unit as herein above described is installed in a class section of the aircraft that offers the lowest standard fare price per seat to customers.

In a second aspect the present invention may be said to be a passenger vehicle seat unit comprising:
  a row of a plurality of adjacent seats supported by a support frame, each seat including a seat back, a seat pan and a leg rest and each seat facing in the same direction, the leg rest of each seat including a leg support surface and mounted relative to the seat frame in a manner to allow it to move between (a) a stored condition and (b) a fully deployed condition where the seat pan and the leg rest support surface are substantially coplanar, and
  wherein the leg rest and seat pan of each seat in the row can cooperate to define a reconfigurable horizontal support surface for at least one passenger.

In a further aspect the present invention may be said to be a passenger vehicle seat unit that comprises a row of three adjacent seats each supported by a support frame and each including a seat back, a seat pan and a leg rest, each leg rest movably mounted to said support frame and relative to the seat pan between a stowed condition and a deployed condition, wherein all the leg rests and seats pans of said three seats are able to be configured to:
  i) define, for at least one person, a horizontal support surface that can assume each of a T-shape, L-shape and U-shape and I-shape when viewed in plan view, and
  ii) allow all three leg rests, in their fully deployed condition, together with the seat pans to support at least one person in a reclined position.

In yet a further aspect the present invention may be said to be a passenger vehicle seat unit that comprises a row of four adjacent seats each supported by a support frame and each including a seat back, a seat pan and a leg rest, each leg rest movably mounted to said support frame and relative to the seat pan between a stowed condition and a deployed condition, wherein all the leg rests and seats pans of said four seats are able to be configured to
  i) define, for at least one person, a horizontal support surface that can assume each of a T-shape, L-shape and U-shape and I-shape when viewed in plan view, and
  ii) allow all four leg rests, in their fully deployed condition, together with the seat pans to support at least one person in a reclined position.

In a further aspect the present invention may be said to be a passenger vehicle seating arrangement comprising:
  i) a first row of a plurality of adjacent seats,
  ii) a second row of a plurality of adjacent seats located adjacent, aligned and in a position advanced more in the vehicle to the first row of seats,
  each seat comprising a seat pan, a seat back upwardly extending from the seat pan and a leg rest, said leg rest mounted relative the seat pan to allow it to move between (a) a stored condition, and (b) a fully deployed condition where the seat pan and the leg rest cooperate to provide substantially horizontal passenger support.

Preferably the seat pan and the leg rest of all seats in said first row can cooperate to provide substantially horizontal passenger support to allow at least one passenger to recline or lie and generally extend in a direction parallel to the row direction and occupy at least two seats of the row.

Preferably the seat pan and the leg rest of all seats in said first row can cooperate to provide substantially horizontal passenger support to allow at least two passengers to recline or lie and generally extend in a direction parallel to the row direction and each occupy at least two seats of the row.

Preferably for each seat, said leg rest in its stored condition is located adjacent said seat pan and below said seat pan.

Preferably the leg rest of each seat in a row, when in the fully deployed condition, in cooperation with the respective seat pan, form at least part of a bed for at least one passenger to recline on, generally in a direction perpendicular to the direction parallel to the advanced direction of the vehicle.

Preferably an armrest is provided at each side of each seat in said first row, at least one of said armrests movable from a position wherein a person sitting in the seat can rest an arm on the armrest and a stored position where the armrest is positioned proximate more and not protruding in a seat facing direction from the adjacent seatback(s).

Preferably each said leg rest can be set at a position intermediate of the stored condition and fully deployed condition to support the legs of a person on the seat.

Preferably the leg rests, of two adjacent seats in said first row, when in a deployed condition, are contiguous each other.

Preferably for any seat in the first row, when its respective leg rest in a stored condition, there is sufficient room for a person to be able to stand intermediate of said seat and the corresponding seat of the second row, and when in the fully deployed position, there is insufficient room for a person to be able to stand intermediate of said seat and the corresponding seat of the second row.

Preferably the leg rest of each seat in said first row, when in the fully deployed condition, spans between its respective seat pan and the corresponding seat of said second row.

Preferably each leg rests of said first row, when all in the fully deployed condition, span between their respective seat pan and the corresponding seat of said second row and together define a surface for two adults to lie on and next to each other.

Preferably each leg rest of said first row, when all in the fully deployed condition, extend from their respective seat pan and the towards a corresponding seat of said second row, all leg rests and seat pans of said first row together defining a surface for two adults to recline on next to each other.

Preferably a tray table is dependent from the seat back of each seats of the second row, said tray table comprising
  i) a primary table top, movable between
    a. a stowed position in which it is disposed towards the respective seat, and
    b. a deployed position in which it extends more from the seat and towards the first row, to provide a primary utility surface; and
  ii) a secondary table top, defined by a plurality of adjacent extension panels each individually coupled to the primary table top, wherein the extension panels are disposed in a side by side configuration at least one edge of the primary panel and can each be moved by a passenger between a stowed condition and a deployed condition where the extension panel projects from the edge of the primary table top and in a co-planar relationship to the primary table top.

Preferably the primary table top includes an edge extending perpendicular to the advanced direction and the extension panels are disposed at said edge and can be moved proximate more and distal more the first row, corresponding to the deployed and stowed conditions of each respective extension panel.

Preferably said secondary table top, is of the same width (in the row direction) as the primary table top.

Preferably the extension panels are hingingly engaged with the primary table top to rotate relative to the primary table top when moved between the stowed and deployed conditions.

Preferably the first row of a plurality of adjacent seats is identical to the second row of a plurality of adjacent seats.

Preferably the row direction of said first row is parallel to the row direction of the second row.

In a further aspect the present invention may be said to be a passenger vehicle including a passenger vehicle seating arrangement as herein above described.

In a further aspect the present invention may be said to be a passenger vehicle seating unit as herein above described and installed onboard a commercial passenger aircraft.

In a further aspect the present invention may be said to be a passenger vehicle seating unit as herein above described and installed in an economy class section of the aircraft.

In a further aspect the present invention may be said to be a passenger vehicle seating unit as herein above described and installed in a class section of the aircraft that offers the lowest standard fare price to customers.

In a further aspect the present invention may be said to be a passenger vehicle comprising
  (i) a first column of a passenger vehicle seating arrangement comprising at least
    a. a first row of a plurality of adjacent seats,
    b. a second row of a plurality of adjacent seats located adjacent, aligned and in a position advanced more in the vehicle to the first row of seats,
    each seat comprising a seat pan, a seat back upwardly extending from the seat pan and a leg rest, said leg rest mounted relative the seat pan to allow it to move between (a) a stored condition, and (b) a fully deployed condition where the seat pan and the leg rest cooperate to provide substantially horizontal passenger support, and
  (ii) a second column of a passenger vehicle seating arrangement parallel to the first column and comprising at least
    a. a first row of a plurality of adjacent seats,
    b. a second row of a plurality of adjacent seats located adjacent, aligned and in a position advanced more in the vehicle to the first row of seats,
    each seat comprising a seat pan, a seat back upwardly extending from the seat pan and a leg rest, said leg rest mounted relative the seat pan to allow it to move between (a) a stored condition, and (b) a fully deployed condition where the seat pan and the leg rest cooperate to provide substantially horizontal passenger support,
    wherein said second column and said first column are separated by at least one aisle.

Preferably each row of seats of said first column includes a window seat and each row of seats of said second column includes a window seat.

Preferably there are two aisles intermediate of said first and second columns, said two aisles separated from each other by a third column of a passenger seating arrangement that is identical at least one of the first and second columns.

Preferably wherein there are two aisles intermediate of said first and second columns, said two aisles separated from each other by a third column of a passenger seating arrangement wherein the third column is different to both the first and second column.

Preferably the rows of seats of the third column comprise of seats that do not include a leg rest.

Preferably the seats of each row of the first and second column, face in a direction parallel to the aisle.

Preferably the passenger vehicle is a commercial passenger aircraft.

Preferably the first and second columns are located in an economy class section of the aircraft.

In yet a further aspect the present invention may be said to be a seating arrangement for a passenger aircraft comprising a plurality of side by side and juxtaposed seats each facing in the same direct and aligned with each other forming a row of seats, each seat including a seat pan and a leg rest that can be moved relative to the seat pan between a stowed condition and a deployed, wherein in the deployed condition the leg rest and seat pan form a horizontal support surface, the leg rests of each seat in the row of seats able to be configured in at least one of its deployed and stored condition to allow a passenger to assume (i) a sedentary position by sitting in a seat and (ii) at least one of a lounging style position and a reclined position, by occupation of at least two seats of the row.

Preferably two companion passengers can each assume (i) a sedentary position by sitting in a respective seat of said row and (ii) at least one of a lounging style position and a reclined position by shared occupation of at least two seats of the row.

Preferably the seating arrangement is in an economy class section of an aircraft.

Preferably each seat also comprises a back rest projecting upwardly from a back edge of said seat pan and wherein in the stowed condition, the leg rest projects downwardly from a front edge of the seat pan and wherein in a deployed condition said leg rest projects from said front edge in a seat facing direction.

Preferably each said leg rest is of a shape and configuration so that when all leg rests of the row are in a deployed condition they offer a resting surface to allow two passengers to lie side by side on the resting surface so formed by the leg rests and the seat pans.

Preferably there are three adjacent seats wherein all the leg rests and seats pans of said three seats are able to be configured to:
i) define, for at least one person, a horizontal support surface that can assume each of a T-shape, L-shape and U-shape and I-shape when viewed in plan view, and
ii) allow all three leg rests, in their fully deployed condition, together with the seat pans to support at least one person in said reclined position.

Preferably there are four adjacent seats wherein all the leg rests and seats pans of said four seats are able to be configured to:
i) define, for at least one person, a horizontal support surface that can assume each of a T-shape, L-shape and U-shape and I-shape when viewed in plan view, and
ii) allow all four leg rests, in their fully deployed condition, together with the seat pans to support at least one person in said reclined position.

Preferably each said leg rest is of a shape and configuration so that when all leg rests of the row are in a deployed condition they are contiguous to adjacent leg rest(s) and contiguous each respective seat pan.

In still a further aspect the present invention may be said to be a passenger vehicle seating arrangement comprising:
i) a first row of a plurality of juxtaposed seats, each seat including a seat back, a seat pan and a leg rest, the leg rest moveably mounted relative to and adjacent the seat pan in a manner to allow the leg rest to move between a stored condition and a fully deployed condition where the seat pan and the leg rest cooperate to provide substantially horizontal support for a passenger,
ii) a second row of a plurality of juxtaposed seats located adjacent and in a position advanced more in the vehicle to the first row of seats,
each seat including a seat back, a seat pan and a leg rest, the leg rest moveably mounted relative to and adjacent the seat pan in a manner to allow the leg rest to move between a stored condition and a fully deployed condition where the seat pan and the leg rest cooperate to provide substantially horizontal support for a passenger,
each seats of the second row supporting a tray table behind its seat back, the tray table comprising at least two panels positioned side by side in a row-wise direction and that can each move between a stowed condition proximate more the seat by which it is supported and a use condition proximate more the first row.

In still a further aspect the present invention may be said to be a passenger vehicle seating arrangement comprising:
a row of a plurality of juxtaposed seats, each seat including a seat back, a seat pan and a leg rest, the leg rest of each seat moveably mounted relative to the seat pan in a manner to allow it to move between a stored condition and an extended condition where the seat pan and the leg rest are substantially coplanar and wherein the leg rest and seat pan of adjacent seats in the row can cooperate to define a reconfigurable support surface for at least one passenger.

Preferably the leg rest moves in a rotational manner relative to said seat pan about an axis of rotation located adjacent said seat pan, between its stored and extended condition.

In still a further aspect the present invention may be said to be a passenger seating unit for an aircraft comprising:
a row of 3 juxtaposed seats, each seat including a seat back, a seat pan and a leg rest, the leg rest of each seat moveably mounted relative to the seat pan in a manner to allow it to move between a stored condition and an extended condition where the leg rest is presented adjacent the seat pan to provide a support surface for a passenger.

Preferably the seat pans are contiguous each other and define a bench and wherein each leg rest, when in the extended condition, is co-planar with its respective seat pan and wherein each leg rest, when in an extended condition, is contiguous the leg rest of an adjacent seat, when said leg rest of an adjacent seat is also in the extend condition.

In still a further aspect the present invention may be said to be a passenger seating unit for an aircraft comprising:
a row of 4 juxtaposed seats, each seat including a seat back, a seat pan and a leg rest, the leg rest of each seat moveably mounted relative to the seat pan in a manner to allow it to move between a stored condition and an extended condition where the leg rest is presented adjacent the seat pan to provide a support surface for a passenger.

Preferably the seat pans are contiguous each other and define a bench and wherein each leg rest, when in an extended condition, is co-planar with its respective seat pan and wherein each leg rest, when in an extended condition, is contiguous the leg rest of an adjacent seat, when said leg rest of an adjacent seat is also in the extend condition.

In still a further aspect the present invention may be said to be a passenger vehicle seat arrangement in a passenger vehicle, said arrangement comprising:
- a plurality of rows of seats each seat in each row facing in the same direction, wherein each row comprises:
- a plurality of juxtaposed and in-line seats, each seat including a seat frame supported seat back, seat pan and leg rest, the leg rest of each seat moveably mounted relative to the seat frame in a manner to allow it to move between a stored condition and a fully deployed condition where the seat pan and the leg rest are substantially coplanar and wherein the leg rest and seat pan of adjacent seats in the row can cooperate to define a reconfigurable support surface for at least one passenger.

Preferably said leg rests of each seat, when in their fully deployed condition are in close proximity to the seat pan of a seat of a row front.

Preferably said proximity is to an extent to prevent a person standing on the floor intermediate of the two rows.

In still a further aspect the present invention may be said to be a tray table located or for location at the back of a backrest of a seat of a passenger vehicle, said tray table comprising
- i) a primary table top, movable between
  - a. a stowed position in which it is disposed towards the backrest, and
  - b. a deployed position in which it extends generally horizontally and away from the backrest; and
- ii) a secondary table top, defined by a plurality of adjacent extension panels each individually coupled to the primary table top, wherein the extension panels are disposed in a side by side configuration at least one edge of the primary panel and can each be moved by a passenger between a stowed condition and a deployed condition where the extension panel projects from the edge of the primary table top and in a co-planar relationship to the primary table top.

Preferably the primary table top includes an edge extending perpendicular to the seat facing direction and the extension panels are disposed at said edge.

Preferably the extension panels are hingingly engaged with the primary table top to rotate relative to the primary table top when moved between the stowed and deployed conditions.

Preferably the extension panels are hingingly coupled to the primary table top.

Preferably the tray table includes at least one arm extending or to extend from the seat and to which the primary table top is engaged in a pivotal manner to allow movement of the primary table top between its stowed position and deployed position.

Preferably the tray table arrangement includes a plurality of arms.

Preferably the primary table top defines a pair of opposed major surfaces.

Preferably the extension panels define a pair of opposed major surfaces.

Preferably the primary table top is quadrilateral in shape.

Preferably the primary table top is rectangular in shape.

Preferably each extension panel is quadrilateral in shape.

Preferably the extension panel is rectangular in shape.

Preferably the primary table top is positioned, in its stowed condition, with one of its major surfaces parallel to the seat back.

Preferably the extension panels define a pair of opposed major surfaces and wherein at least one or more of the extension panels is disposed in its stowed position with one of its major surfaces abutting a major surface of the base panel.

Preferably at least one or more of the extension panels is disposed in its stowed position with one of its major surfaces abutting a major surface of another extension panel.

In yet a further aspect the present invention may be said to be a passenger accommodation system of a passenger vehicle, said system comprising
- i) a seating arrangement comprising
  - a. a first row of a plurality of adjacent seats,
  - b. a second row of a plurality of adjacent seats located adjacent, aligned and in a position advanced more in the vehicle to the first row of seats, each seat comprising a seat pan, a seat back upwardly extending from the seat pan and a leg rest, said leg rest mounted relative the seat pan to allow it to move between (a) a stored condition, and (b) a fully deployed condition where the seat pan and the leg rest cooperate to provide substantially horizontal passenger support,
- ii) a tray table located at the back of a backrest of each seat of said second row, said tray table comprising
  - a. a primary table top, movable between
    - a stowed position in which it is disposed towards the backrest, and
    - a deployed position in which it extends generally horizontally and away from the backrest; and
  - b. a secondary table top, defined by a plurality of adjacent extension panels each individually coupled to the primary table top, wherein the extension panels are disposed in a side by side configuration at least one edge of the primary panel and can each be moved by a passenger between a stowed condition and a deployed condition where the extension panel projects from the edge of the primary table top and in a co-planar relationship to the primary table top.

In still a further aspect the present invention may be said to be a method of configuring a passenger resting zone onboard a passenger aircraft, said zone defined at least in part by a row of at least three reconfigurable and adjacent seats, each seat including a seat back, a seat pan and a leg rest moveably mounted relative to the seat pan in a manner to allow it to configure to a stored condition and an extended condition where the seat pan and the leg rest are substantially coplanar and capable of being presented contiguous the leg rest of an adjacent seat in the row, said method comprising configuring the leg rests of each seat in the row to at least one the following:
- i) a configuration where all the leg rests of the row in their extended condition such that each leg rest and seat pan of adjacent seats in the row can cooperate to define a horizontal support surface for at least one and preferably two passengers to lie on,
- ii) a configuration wherein only the leg rest of a seat at one end of the row is in the extended condition,
- iii) a configuration wherein each of the leg rests of the seats at each end of the row is in the extended condition,
- iv) a configuration wherein the leg rest of a seat at one end of the row is not in the extended condition (e.g. in the stored condition or otherwise), and
- v) a configuration wherein only the leg rest(s) of the seat(s) intermediate of the ends of the row are in the extended condition.

In still a further aspect the present invention may be said to be a method of accommodating at least two passengers in a vehicle in a space that can be set up in an individual/private mode or in a communal/space sharing mode, said method facilitated by providing said space between a first row of a plurality of side by side and adjacent seats facing in a first direction and a second row of side by side and adjacent seats facing in said first direction and located in a first direction more proximal position to said first row of seats, each seat of said first row including a seat back, a seat pan and a leg rest, the leg rest moveably mounted relative to and adjacent the seat pan in a manner to allow the leg rest to move between a stored condition and a fully deployed condition where the seat pan and the leg rest cooperate to provide substantially horizontal support for a passenger.

In even a further aspect the present invention may be said to be a passenger accommodation unit for use by at least two passengers of a passenger vehicle, said accommodation unit comprising a row of at least two adjacent seats each supported by a support frame above the floor of said passenger vehicle, and each seat including a seat back, a seat pan and a leg rest, each leg rest mounted relative to the seat pan in a manner to be movable between a stowed condition and a deployed condition, wherein in a deployed position, the leg rests of each seat are contiguous the adjacent leg rest and contiguous their respective seat pans, to define a horizontal support surface comprised of the leg rests and seat pans of said at least two adjacent seats.

Preferably said unit is customizable into at least two modes of use, a first communal mode wherein the at least two passengers both occupy said at least two seats and a second private mode wherein each passenger occupies only one seat.

In still a further aspect the present invention may be said to be a method of configuring a passenger seating zone onboard a passenger vehicle, said passenger seating zone comprising a row of at least three reconfigurable and adjacent seats, each seat including a seat back, a seat pan and a leg rest moveably mounted relative to the seat pan in a manner to allow it to configure to a stored position and an extended position where the seat pan and the leg rest are substantially coplanar and capable of being presented contiguous the leg rest of an adjacent seat in the row, said method comprising the steps of:
  selecting a first of the leg rests for movement from its stored position to its extended position; and then
  moving the first of the leg rests to the extended position.
  Preferably the method also comprises the steps of:
  selecting a second of the leg rests for movement from its stored position to its extended position; and then
  moving the second of the leg rests to its extended position.
  Preferably the step of selecting the first of the leg rests comprises selecting a leg rest of an end seat of the row.
  Preferably the step of selecting the first of the leg rests comprises selecting a leg rest of an intermediate seat of the row.
  Preferably the step of selecting the second of the leg rests comprises selecting a leg rest adjacent to the first selected leg rest.
  Preferably the step of selecting the second of the leg rests comprises selecting a leg rest that is not adjacent to the first selected leg rest.
  Preferably comprising the steps of:
  selecting a third of the leg rests for movement from its stored position to its extended position; and then
  moving the third of the leg rests to its extended position.

In still a further aspect the present invention may be said to be a passenger vehicle comprising:
a row of adjacent seats that define an accommodation zone occupied by two adult passengers, wherein the zone is able to be configured to allow the two passengers to (i) be in an upright sedentary position in a respective seat of the row and (ii) be in a reclined position where the two passengers share at least one seat of said row and at least partially occupy at least two seats in the row.

Preferably there are 3 or 4 adjacent seats of said row.

Preferably the zone is able to be configured to allow the two passengers to share at least two or all seats of the row and at least partially occupy at least three or all seats in the row.

Preferably the zone is able to be configured to allow the two passengers to lie horizontally and adjacent to each other across all seats in said row.

Preferably the zone is able to be configured by at least one of said passengers.

Preferably each seat comprises a seat pan and a leg rest that is able to move between a stowed condition and a fully deployed condition relative to said seat pan and that in the fully deployed condition is presented adjacent said seat pan in a manner such that wherein when the leg rests of all seats in the row are positioned in a fully deployed condition, the seat pans and leg rests define a horizontal surface to be able to support said two passengers in a reclined position.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred embodiments of the present invention are shown in the accompanying drawings in which.

DETAILED DESCRIPTION OF THE INVENTION

Figure 1A:
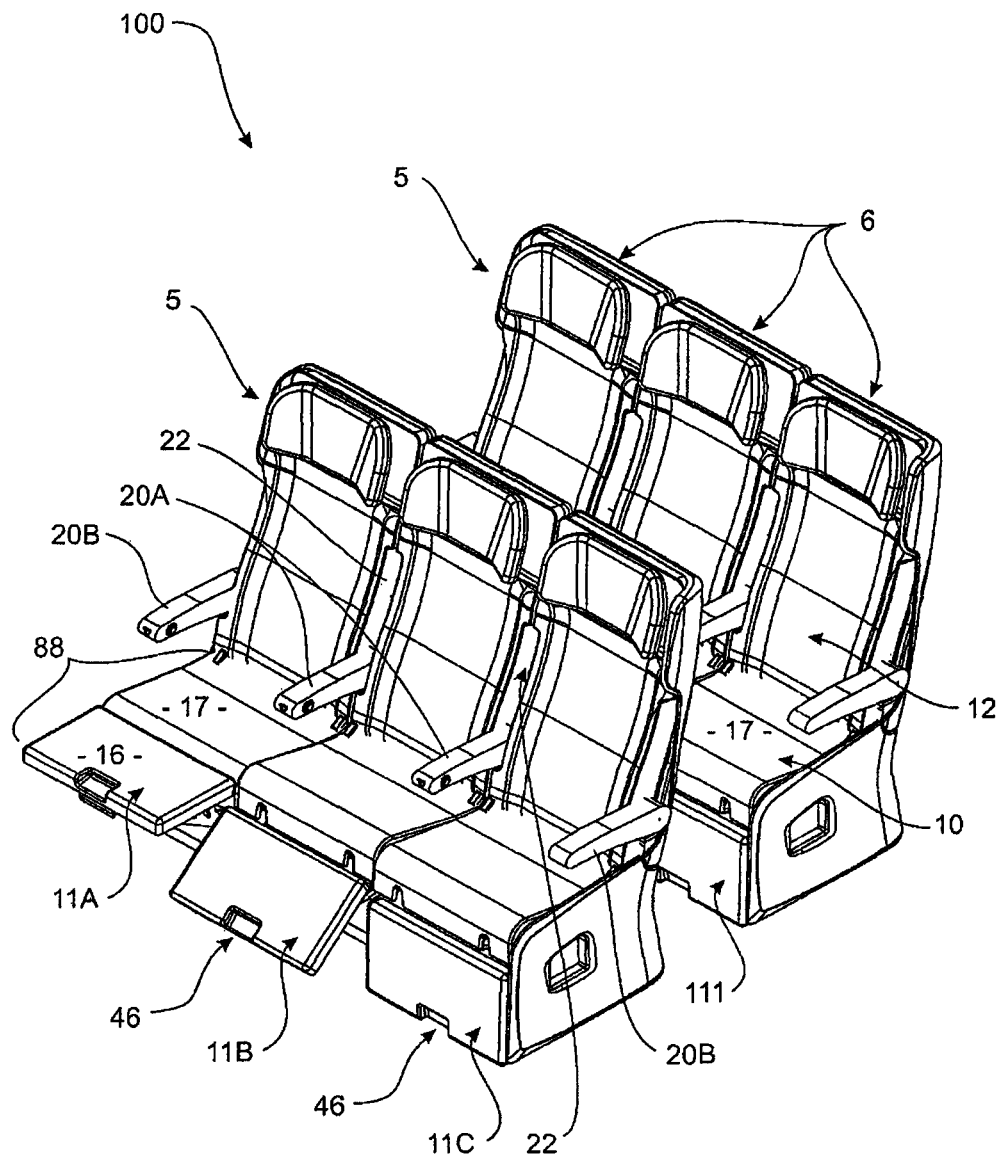
FIG. 1a shows a front perspective view of a seating arrangement with individual seats of the front row positioned in various configurations.

With reference to the above drawings, in which similar features are generally indicated by similar numerals, there is shown a seating arrangement 100.

FIG. 1 shows a seating arrangement 100 that can be implemented on board a commercial passenger aircraft 300. And preferably in its economy class section. The seating arrangement 100 consists of at least one and preferably at least two rows 5 of seats 6 that are positioned one behind the other. Each row of seats 5 includes at least 2 and preferably at least 3 adjacent seats 6. Each seat 6 in a row 5 includes a seat back 12, seat pan 10 and preferably also a leg rest 11. Each seat 6 can receive a passenger in a sedentary position. Each seat defines an individual space in the row for a sedentary passenger to occupy. Such a passenger may occupy such a space and may utilise the seat's backrest, seat pan and leg rest. They may also use the arm rests that may be presented on each side of the passenger. Arm rests 20 may be movable from an in use position where the arms of a passenger can rest on them, and a stowed position, where the arm rests generally are not located in the general space between the seat pans and back rests. The arm rests may be removable, or may move down to be between seat pans of move back to be between back rests of the row of seats. For example the arm rests 20A may be moved to a stowed position where they extend substantially vertically and/or may be recessed within/or between the back rests of adjacent seats 6 in that row.

The armrest(s) 20A can pivot between the deployed position and a stowed position about a horizontal axis and when in the stowed position are substantially out of the way of passengers. In the preferred embodiment the stowed position may be in a cavity 22 formed between two adjacent seat backs 12.

The outer most arm rests 20B may or may not be movable. However, they may be movable in a like manner to the arm rests 20A.

Each row preferably faces in a forward direction in relation to the body of the aircraft. In other words, the seat back 12 faces toward the front of the aircraft. Each row 5 preferably faces in the same direction. A column of plurality of rows can be defined in the aircraft, the column direction may be parallel to the seat facing direction. And may be parallel to the elongate direction of the body of the aircraft.

The seats in each row are positioned adjacent each other The seat pans are preferably able to assume a condition contiguous each other so that a bench or couch like sitting surface may be defined by the at least two seats. The back rests 12 of each seat 6 may recline from an upright more position to a reclined more position. This can be achieved independent of the position of adjacent back rests. The seats may be individual seats each separately mounted to the floor track or tracks of the aircraft or may all be supported by one or more support frames mounted to the floor track or tracks of the aircraft.

Preferably each row has at least two adjacent seats, more preferably at least three seats or four adjacent seats.

Preferably each seat includes a leg rest arrangement 111. The arrangement includes a leg rest 11 and a leg rest mechanism 112.

The leg rest can be moved between a stored position where it is located adjacent or proximate the front edge of a seat pan and extends downwardly therefrom and a fully deployed position where is it located adjacent a front edge of a seat pan and extends generally in a coplanar manner with the seat pan. It will be appreciated that surface contouring of the upper surface 17 of the seat pan and of the supporting surface 16 of the leg rest may exist. And that not the entire surface of the seat pan and the leg rest are strictly in a co-planar relationship, but may be close to it. In at least the fully deployed position, the leg rest is contiguous the seat pan. A small but insignificant gap may exits. It may also be and preferably remain contiguous when in the stored and any intermediate position.

The position of the leg rest relative to the seat pan can be independently controlled relative to the other leg rest of the other seats 6 in the row 5. Accordingly a passenger sitting in an individual seat can select a desired leg rest position.

With reference to the forward most row 5 shown in FIG. 1, each seat 6 in that row shows its respective leg rest in a different position. Leg rest 11A is shown in a fully deployed position, leg rest 11B is shown in a partially deployed position and leg rest 11C is shown in a stored position.

In the fully deployed position as shown with reference to leg rest 11A, the supporting surface 16 cooperates with the respective seat pan to define a horizontal support zone 88. It is referred to as "horizontal" herein, though may not, or not always be perfectly horizontal in use as that may depend on the inclination of the aircraft. In essence, the horizontal support zone, in normal mode of use and when established, will offer a passenger support in a vertical direction.

Figure 1B:
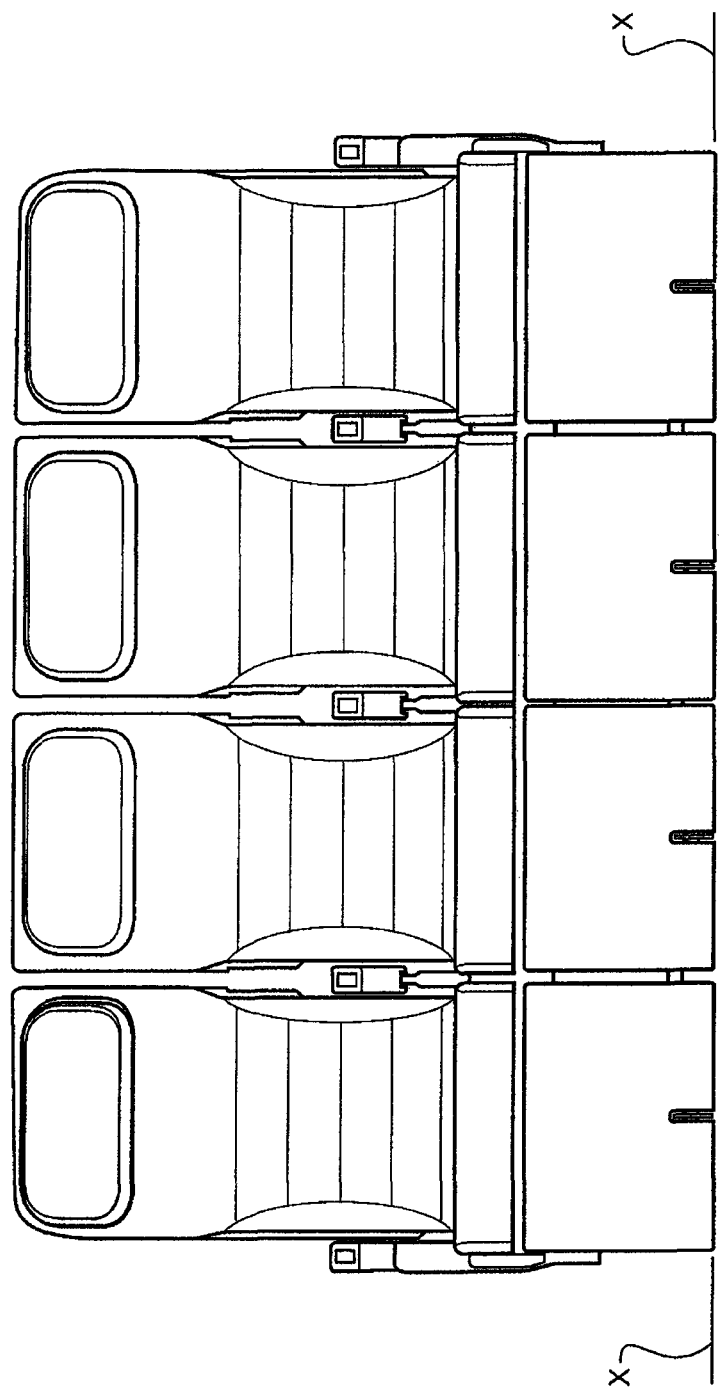
FIG. 1b shows a front view of a seat unit.
Figure 3:
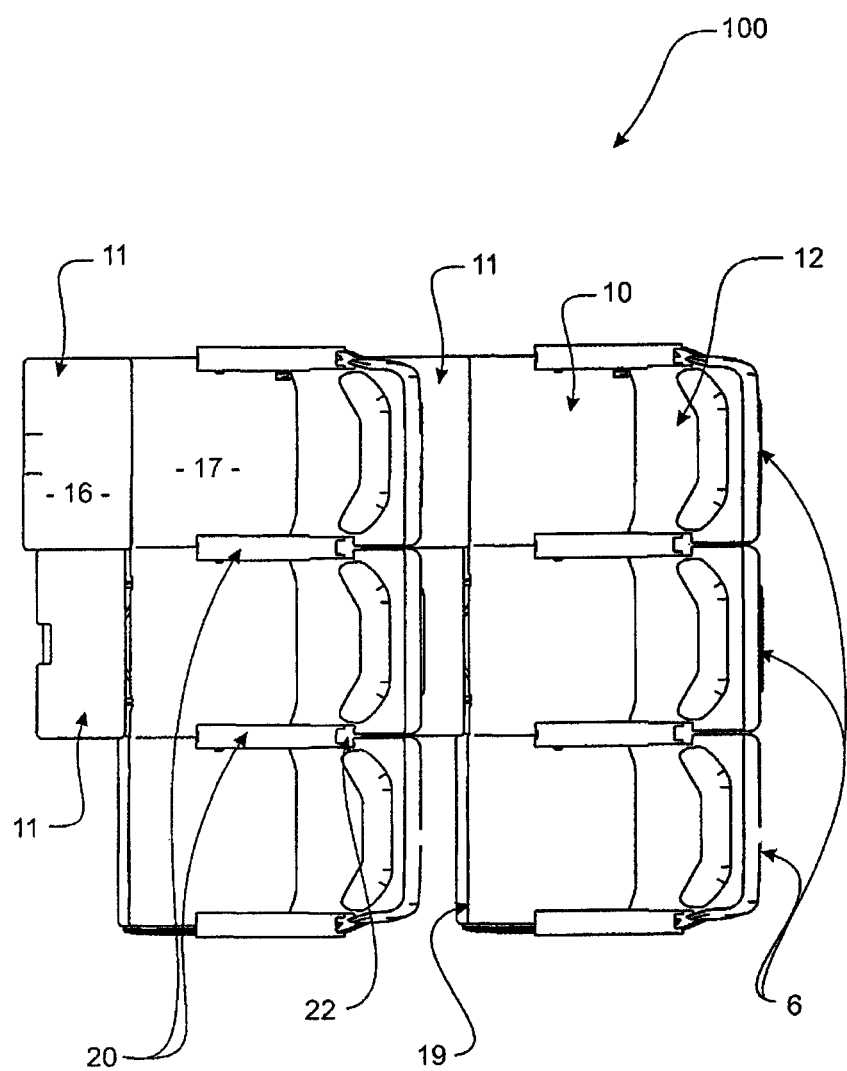
FIG. 3 shows a top view of a seating arrangement of FIG. 1.
Figure 4A:
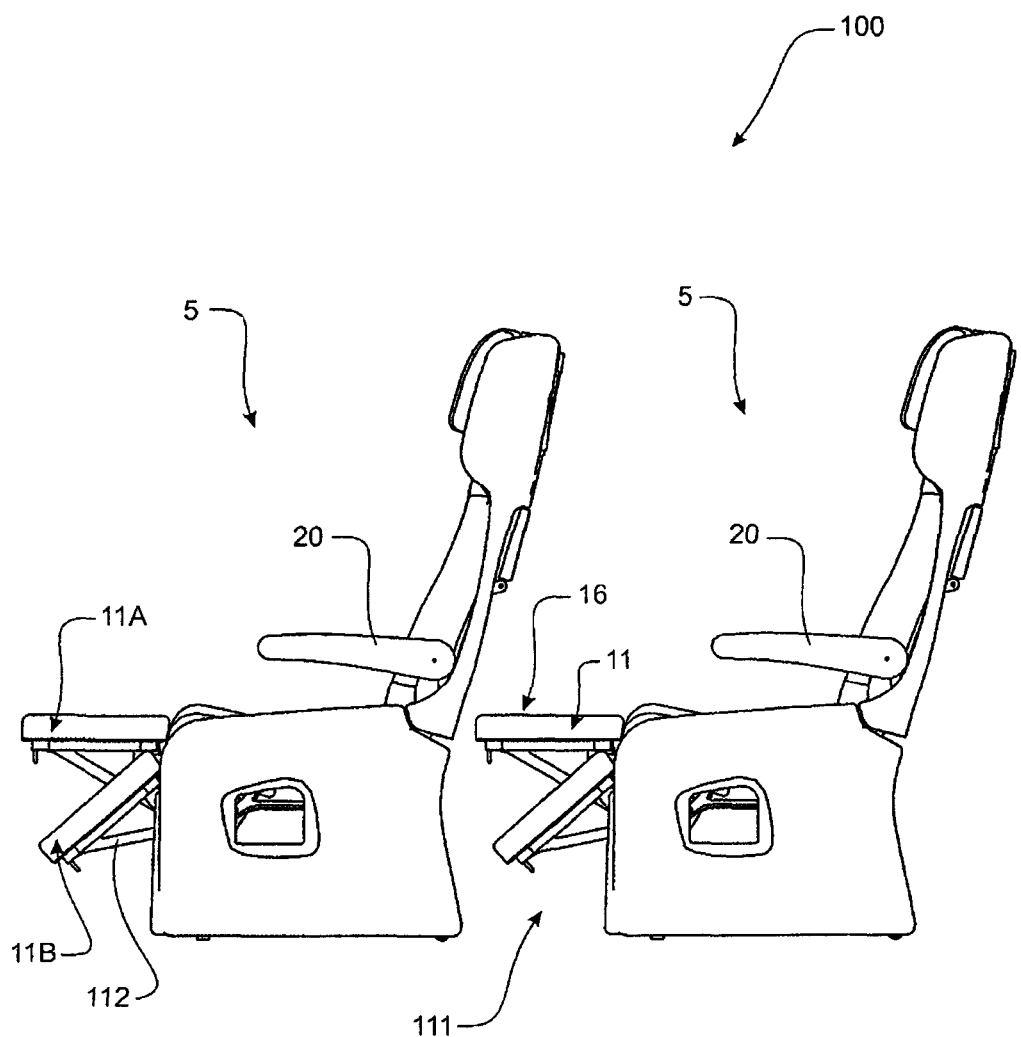
FIG. 4a shows a side view of a seating arrangement of FIG. 1.
Figure 4B:
FIGS. 4b-g shows a plan schematic view of a row of 3 seats of different configurations of leg rests relative to seat pans that can be achieved.
Figure 4C:
Figure 4D:
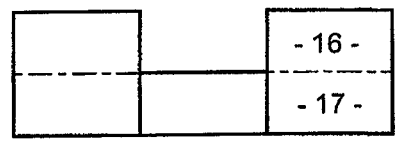
Figure 4E:
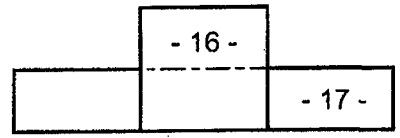
Figure 4F:
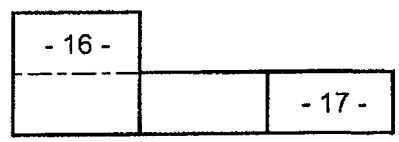
Figure 4G:
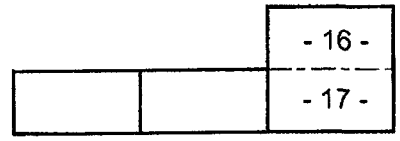
Figure 5A:
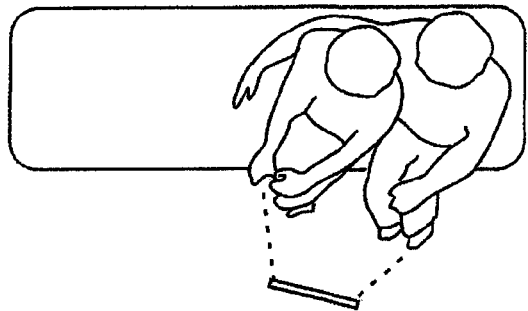
FIG. 5a-5d shows a plan view of how a seating arrangement may be utilised for companion travellers, comprising two adults, to allow the creation of a communal/shared space.
Figure 5B:
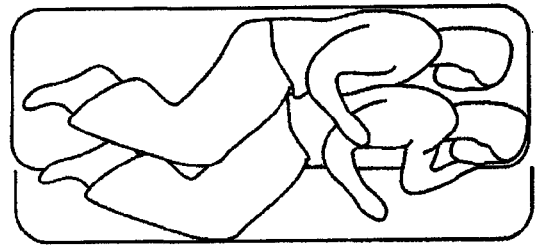
Figure 5C:
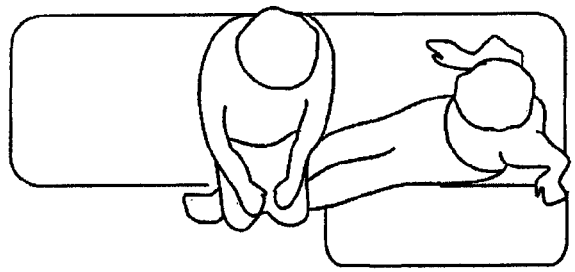
Figure 5D:
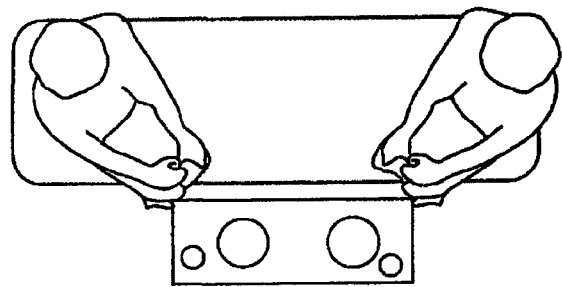
Figure 6A:
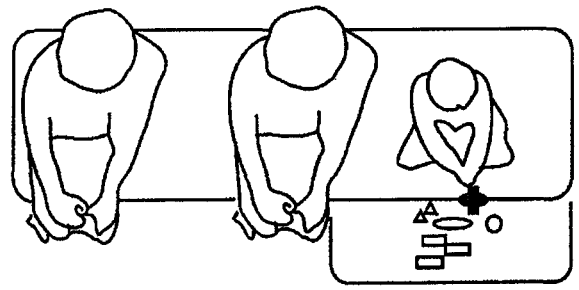
FIG. 6a-6d shows a plan view of how a seating arrangement may be utilised for companion travellers, comprising two adults and a child, to allow the creation of a communal/shared space.
Figure 6B:
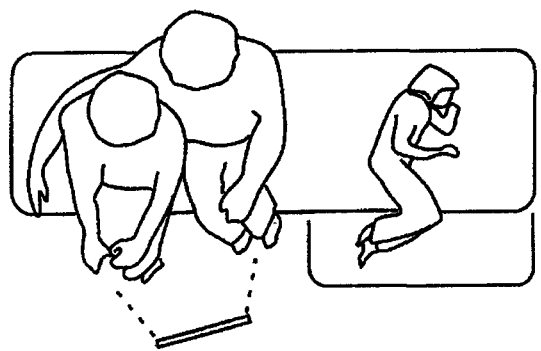
Figure 6C:
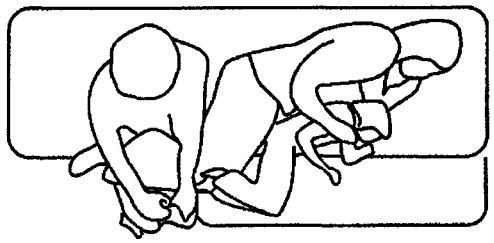
Figure 6D:
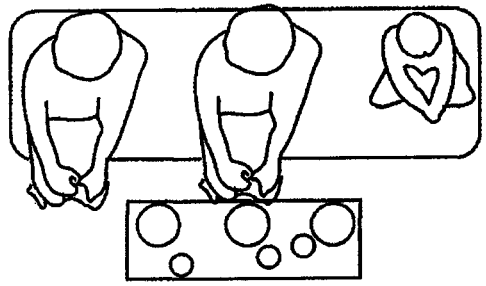
Figure 6E:
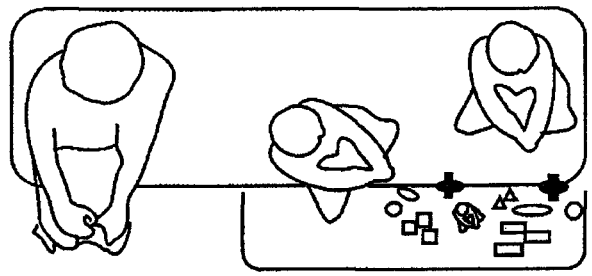
FIG. 6e-6h shows a plan view of how a seating arrangement may be utilised for companion travellers, comprising one adult and two children, to allow the creation of a communal/shared space.
Figure 6F:
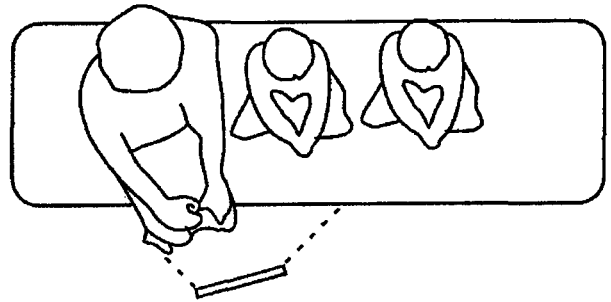
Figure 6G:
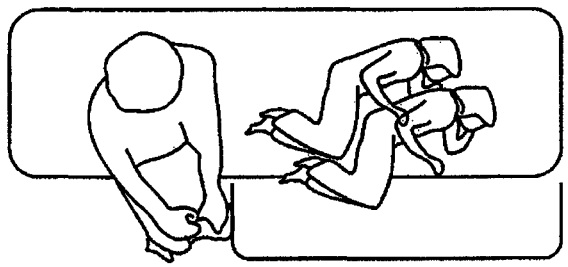
Figure 6H:
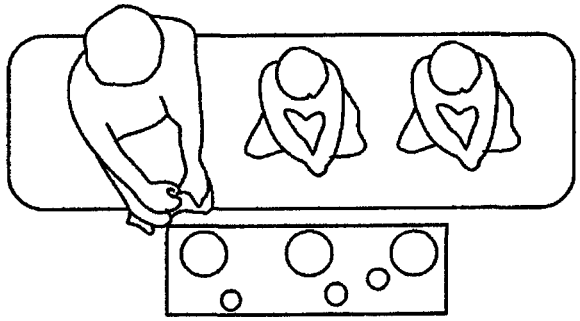
Figure 7A:
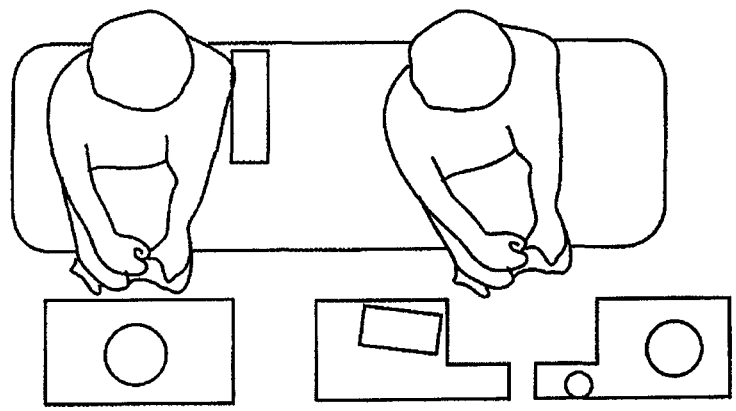
FIGS. 7a and 7b shows a plan view of how a seating arrangement may be utilised for individual travellers, comprising two adult, to provide reconfigurable individual space.
Figure 7B:
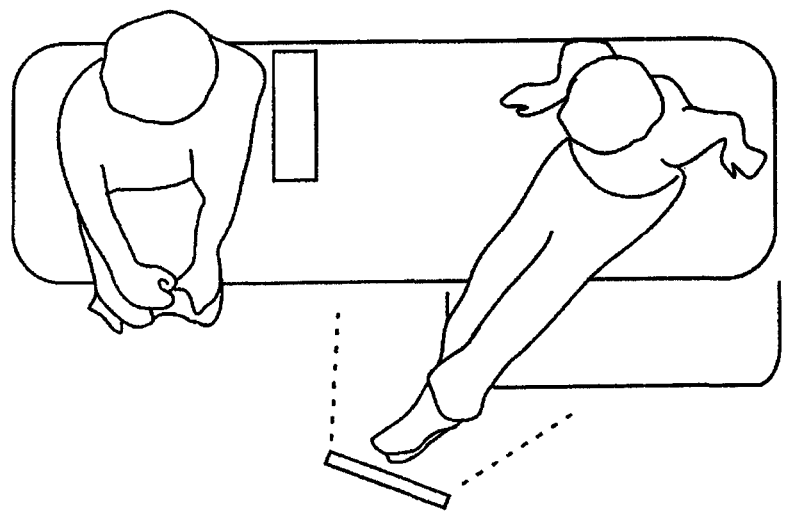
Figure 7C:
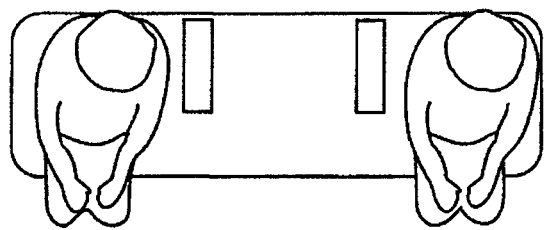
FIGS. 7c and 7e shows a plan view of how a seating arrangement may be utilised for non-companion but associated travellers such as two business people to provide reconfigurable individual and shared space.
Figure 7D:
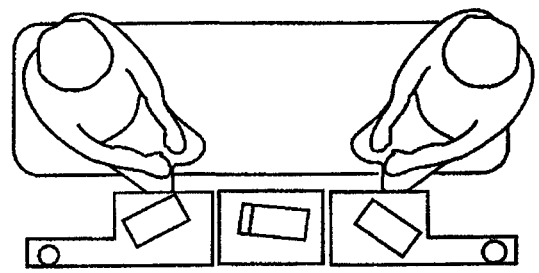
Figure 7E:
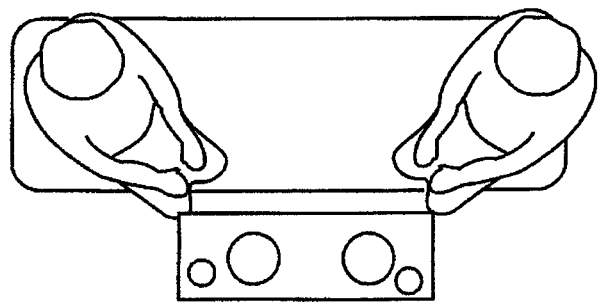
Figure 8:
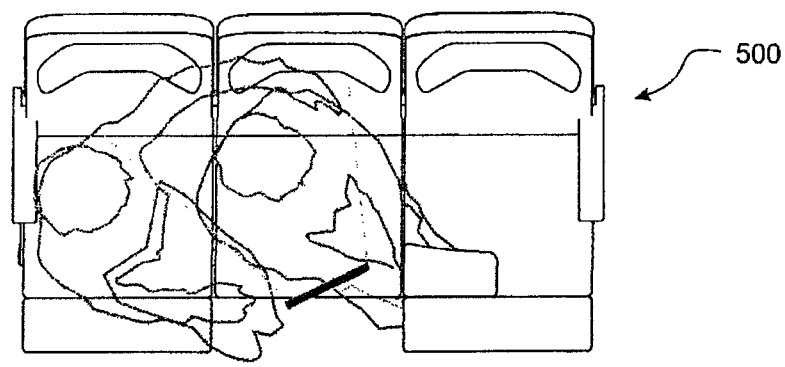
FIGS. 8-28 shows schematic plan views of seating arrangements in various configurations, including typical arrangements of passengers, illustrating the flexibility of the seating arrangement.
Figure 9:
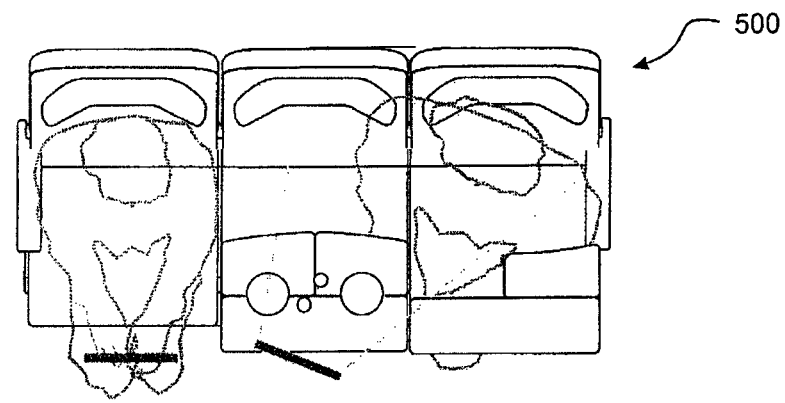
Figure 10:
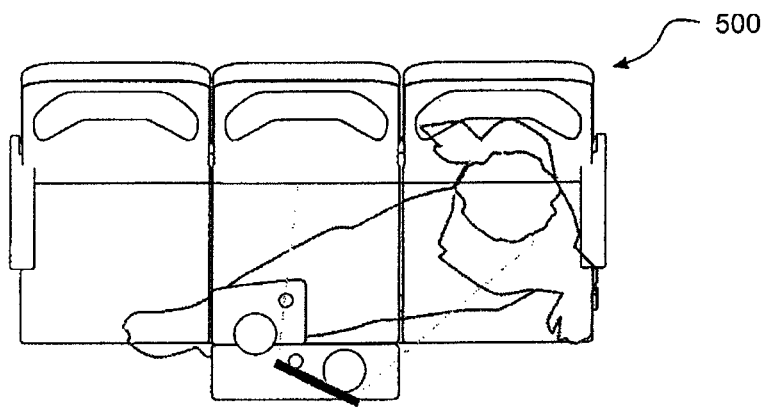
Figure 11:
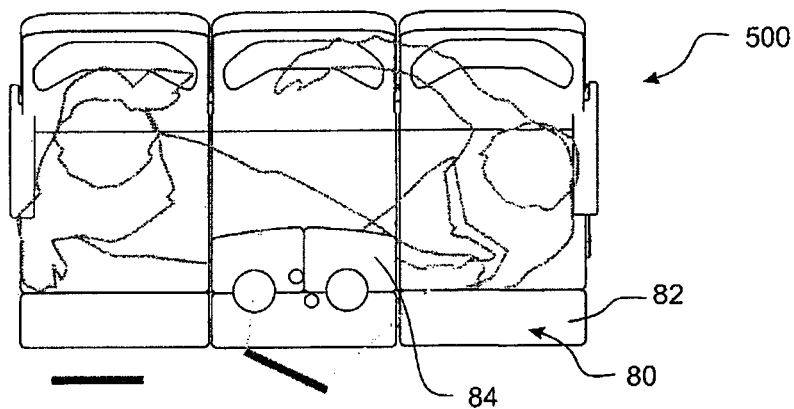
Figure 12:
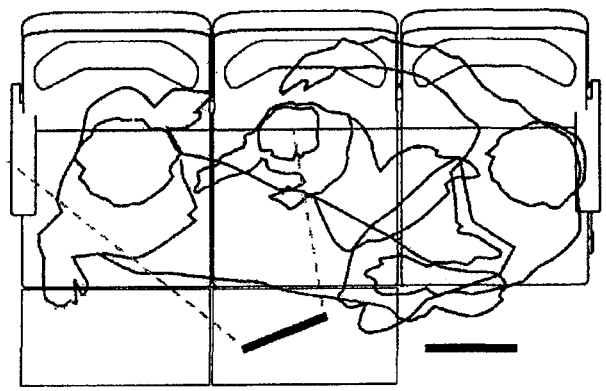
Figure 13:
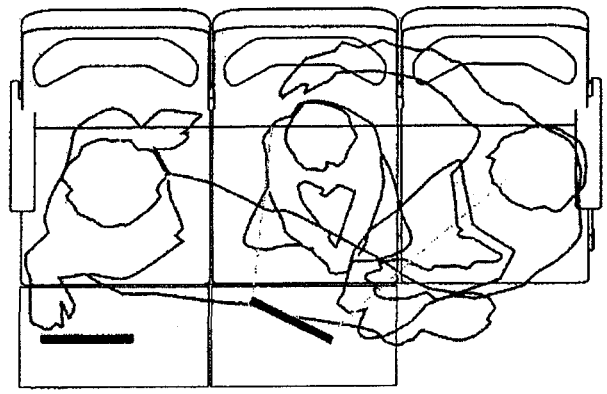
Figure 14:
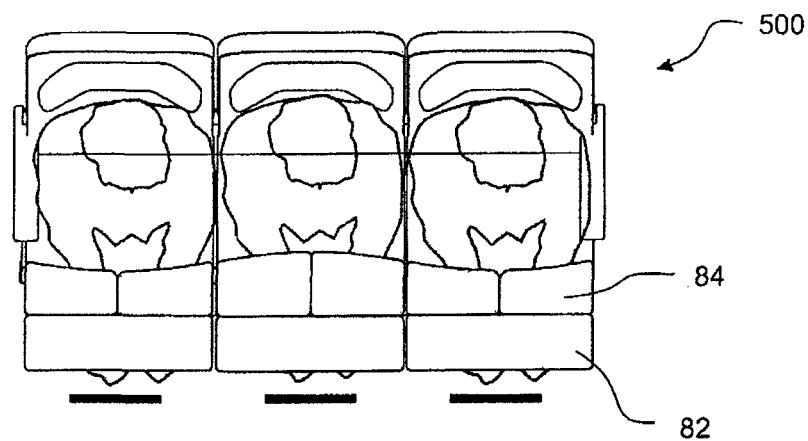
Figure 15:
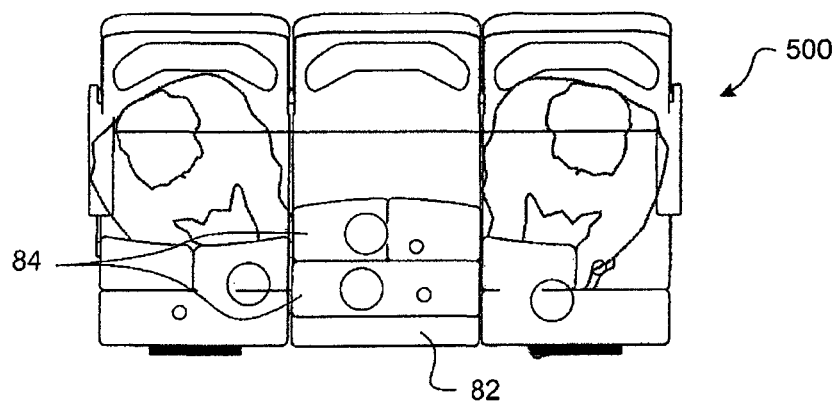
Figure 16:
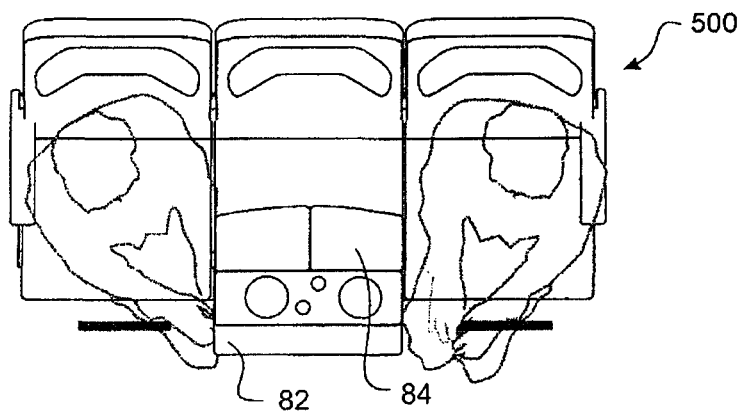

With reference to FIGS. 3 and 4 it can be seen that the supporting surface 16 of a leg rest 11 may in its fully extended position also extend a substantial distance between the leading edge 19 of the seat pan, and a seat 6 (such as its back rest) of a row in front of the leading edge 19. In the preferred form, the leg rest 11 in its fully deployed position closes the gap between rows of seats. There may still be a slight gap but such is preferably insufficient for a person to stand up in between rows on the floor X-X of the cabin of the aircraft as shown in FIG. 1b.

By providing a leg rest 11 for each seat 6 in a row that can be positioned independent of adjacent leg rests in the row, each passenger in that row can make a decision about the desired leg rest position of the seat 6 that that passenger is sitting in.

Figure 18:
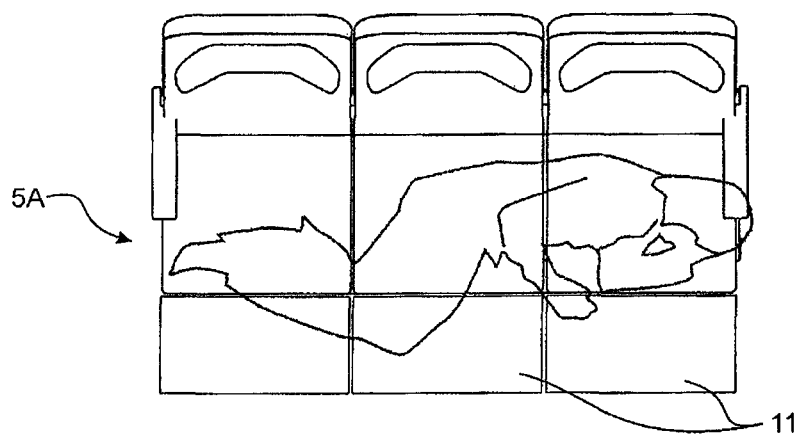
Figure 19:
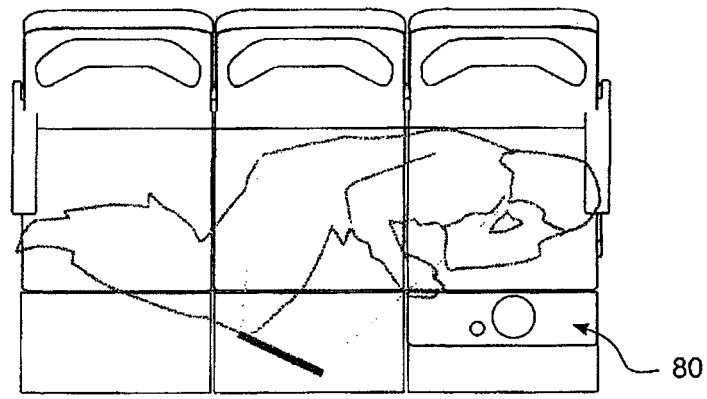
Figure 20:
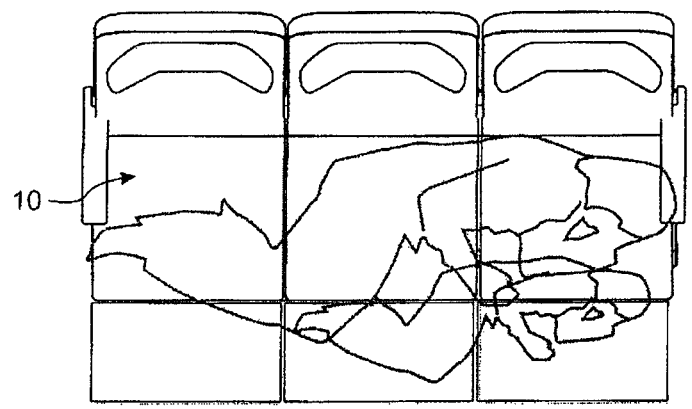
Figure 21:
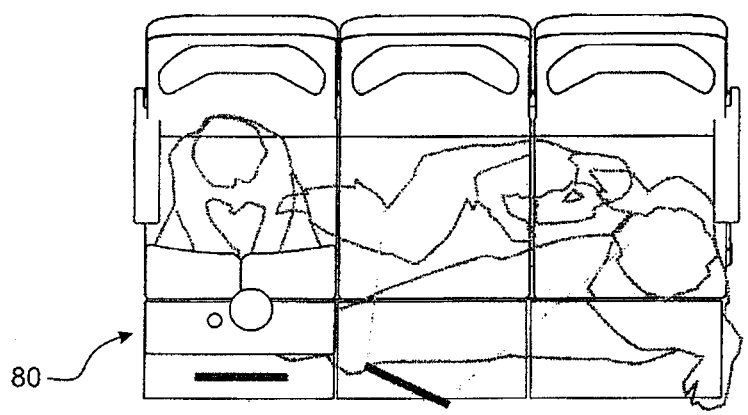

Furthermore, the provision of such independent leg rests in a row 5 can allow for cooperation of leg rests of each row. For example, with reference to FIG. 18, row 5A shows the leg rest of each seat moved to a fully deployed position. And the arm rests 20A may be moved to a stowed position. This allows for the creation of a sleeping surface that one or more passengers can utilise. As can be seen a passenger in row 5A can lie in a general direction lateral to the forward/aft direction of the aircraft. Where the row is adjacent the side of the cabin interior, the armrest 12A or 13B can also be moved out of the way. This can allow a passenger to recline against the cabin interior wall at that location, thereby creating even more space for that or each passenger in the row.

In the configuration where all leg rests in a row of seats are extended a single passenger may lie or recline more on the sleeping or resting surface so defined by at least two or more of the seat pans and associated extended leg rests. Multiple passengers such as an adult and a child may be able to share such a sleeping or resting surface. A child may also use the surface or part of the surface as a play area. The surface may also offer support to a person preferring to sit in an upright position but with their legs extending substantially horizontally as for example as shown in row 5B in FIG. 17. Eg for use as a lounger.

Figure 17:
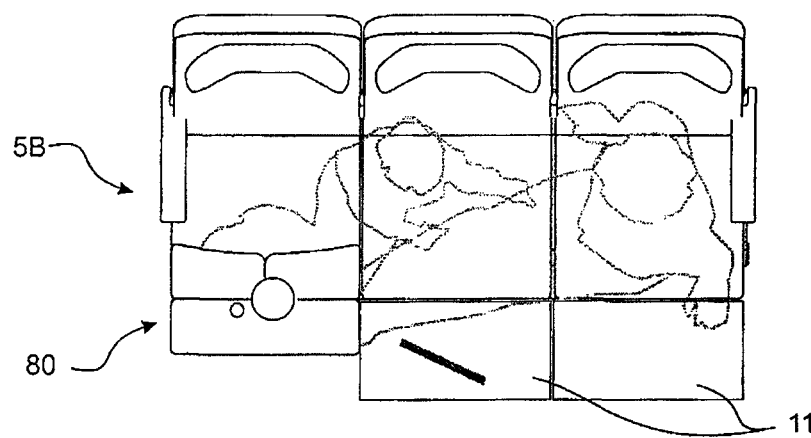
Figure 22:
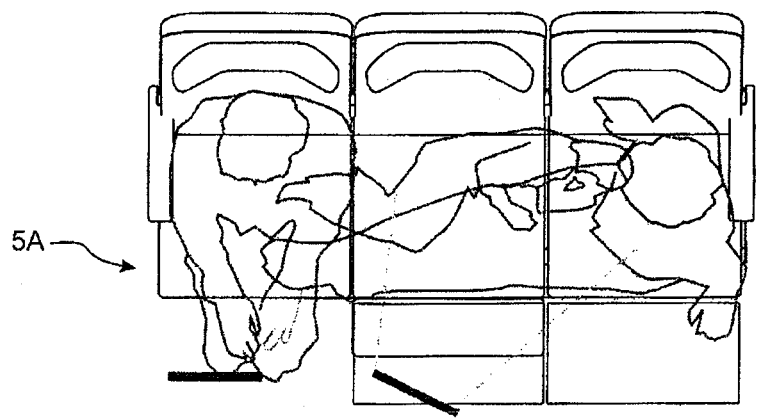
Figure 23:
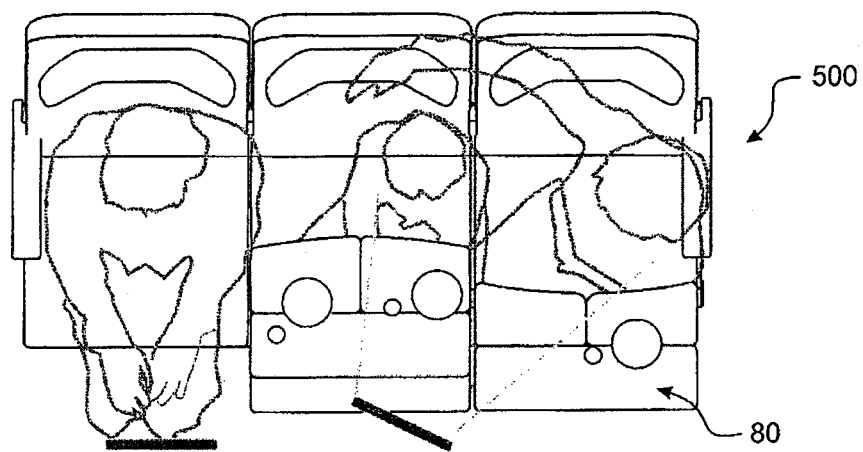
Figure 24:
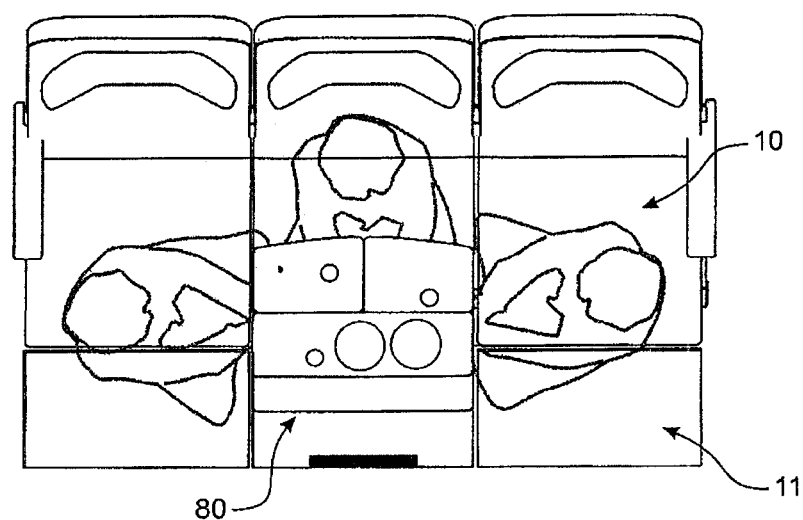
Figure 25:
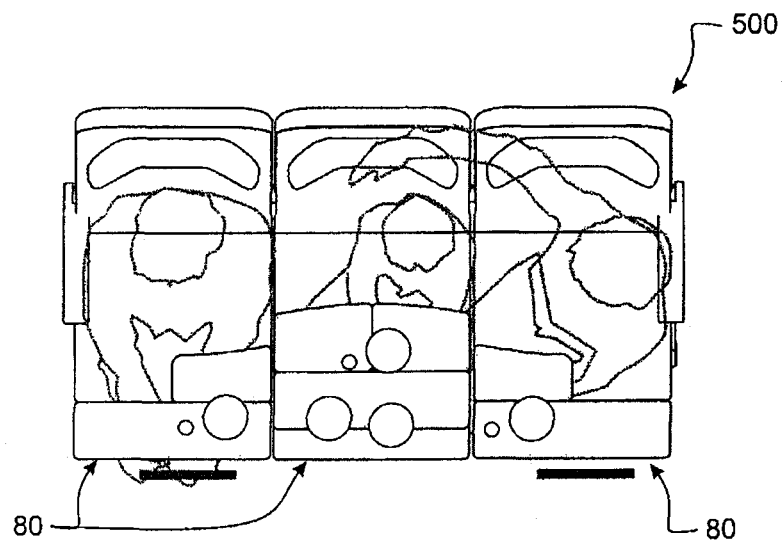
Figure 26:
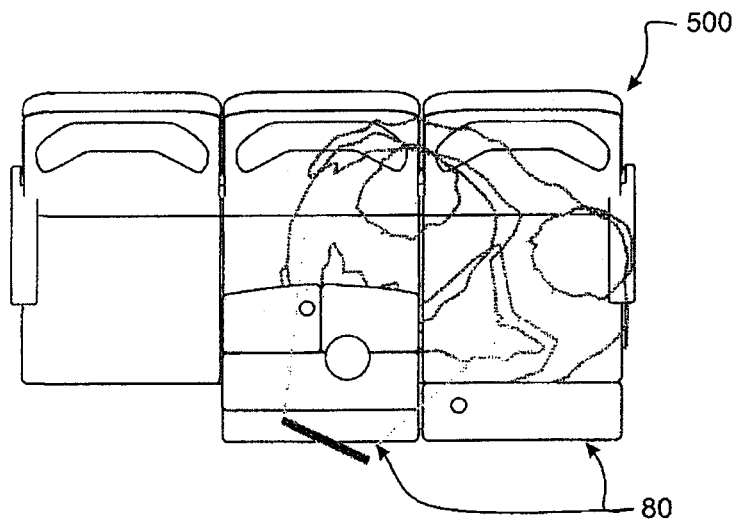

It will be appreciated that in a reclined position of a person, a sleeping or resting surface defined by two adjacent seat pans and leg rests may be sufficient thereby allowing for a seat at one end of the row to have its leg rest in a non-fully deployed position such as in a partially extended or stored position as shown with respect to row 5B of FIG. 17. This is also shown with reference to row 5A shown in FIG. 22. Likewise other seats in the row may have their leg rests in a non-fully deployed position.

Figure 27:
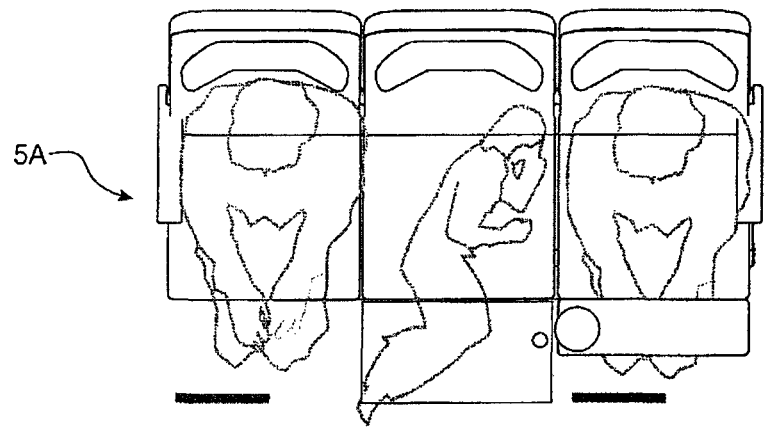
Figure 28:
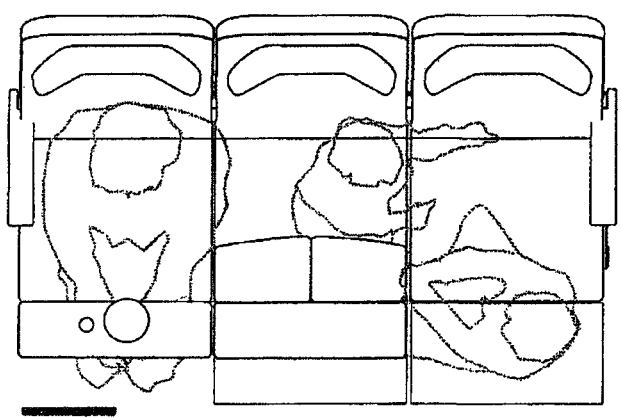

Various combinations of leg rest positions of the leg rests 11 in a row can be achieved. For a row of 3 seats, some of the different combinations are shown in FIGS. 4b-4g. With reference to row 5A shown in FIG. 27, seats 6 at the end of a row 5 may have their leg rests 11 in a stored position whereas the leg rest arrangement 11 of the intermediate seat(s) 6 may be fully extended. In a fully extended position a passenger in the intermediate seat arrangement may be able to sit up with their legs extending substantially horizontally. Alternatively where the person is of a smaller size, the person may be able to lie down. This may be particularly beneficial for adult passengers travelling with babies or small children and can allow for babies or small children to rest more comfortably. FIGS. 5-7 show other configurations that can allow for the space between rows of seats to be customised by passengers depending on their needs and/or preferences.

The supporting surface 16 of each leg rest may be defined by a cushion. There may also be a life jacket compartment containing a life jacket that is incorporated in the leg rest and for access by a passenger at the supporting surface 16.

The leg rest 11 is movable relative to the seat pan and the support frame of the seat by which it is supported in a pivoting manner between the stored and fully deployed positions. The leg rest in such movement passes through a partially extended position (as shown in FIG. 1a). In the stored position, the leg rest 11 is stowed at least partially beneath the seat pan 10. In the partially extended position, it is envisaged that the support surface of the leg rest 11 will be in a range of between 30 and 60 degree to the vertical, and most preferably at about 45 degrees to the vertical and projecting downwardly and away from the seat pan.

Typically when an aircraft is about to land and/or take off and/or during taxi, the leg rest 11 may be required to be in its stored position. This provides a clear space between rows for evacuating passengers during an emergency. During taxi/take-off/landing the leg rest may need to be sufficiently restrained to prevent it from movement significant relative to the support structure under certain loads.

It is envisaged that the leg rest mechanism will be manually moved by a user or passenger preferably at least in part assisted by use of a hydrolock. An electric motor may be instead or also be used. Alternatively no such means for assistance may be provided.

With reference to FIGS. 35-40 there is shown a preferred form of leg rest arrangement 111. The leg rest arrangement includes the leg rest 11 and a leg rest mechanism 112. The leg rest mechanism 112 is adapted to support a passenger's weight bearing down on the leg rest when in the fully deployed position.

Provided are a pair of support mechanisms 120 for supporting the leg rest 11, an adjustable support mechanism 160 and an optional drive arrangement 20.

As previously mentioned, the leg rest 11 may be moveable between a stowed position in which it may be predominantly located below and/or under the seat pad 200, an intermediate position up to which the leg rest 11 can be adjustably supported; and a fully deployed position.

Each support mechanism 120 comprises an adjustable support mechanism 160 for supporting the leg rest in a plurality of positions between its stowed position and its intermediate position. And a horizontal support mechanism 120 for coupling the leg rest to the seat frame 600 to support the leg rest in its fully deployed position.

The leg rest is moveable only manually to its extended position from its intermediate position.

The leg rest pivots about axis Y-Y. This axis is horizontal and perpendicular to the seat facing direction.

Figure 42:
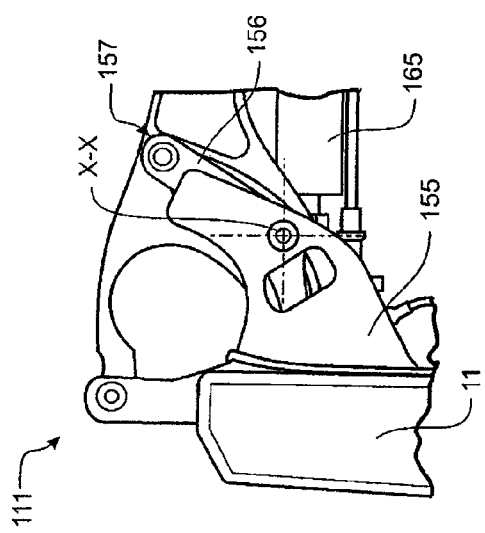

The horizontal support mechanism 120 includes a track formation 130 and a track follower arrangement 150. The horizontal support mechanism 120 is configurable between a stowed position (shown in FIGS. 40 and 42), corresponding to the stowed position of the leg rest, an intermediate position corresponding to the intermediate position of the leg rest, and a fully deployed position (shown in FIG. 44).

Figure 49:
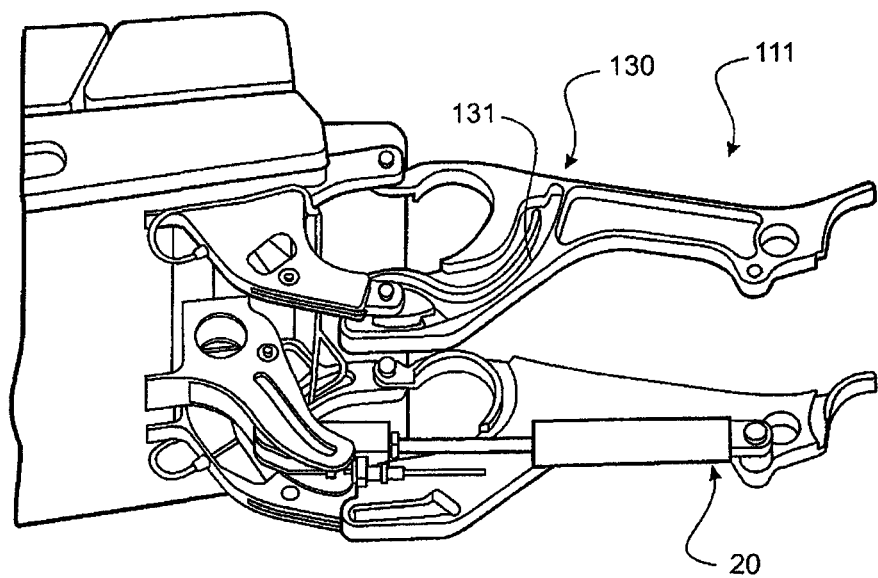
FIG. 49 shows a bottom perspective view of a leg rest mechanism.
Figure 50:
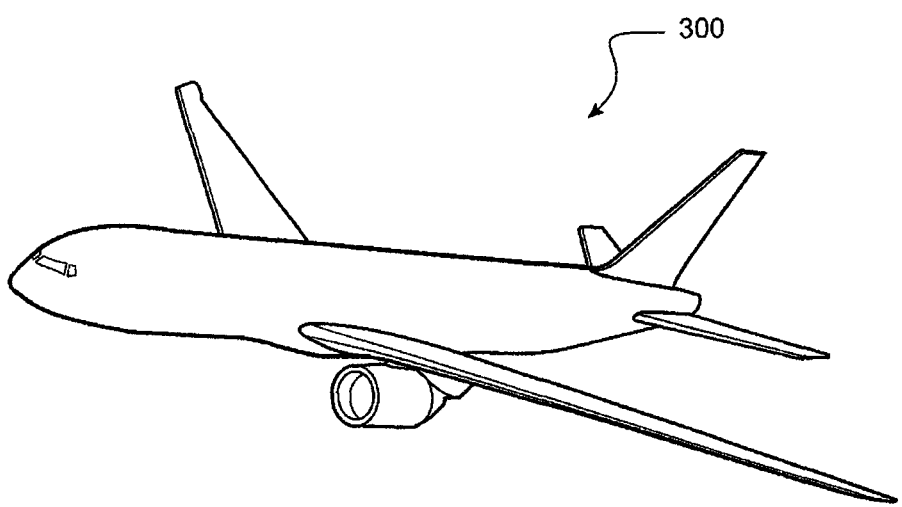
FIG. 50 shows an aircraft that may carry the seat units and seating arrangement and onboard which the methods of the present invention may be performed.

The horizontal support mechanism 120 comprises a track formation 130, in one embodiment shown in FIG. 49 as a cam slot 131, and is fixed relative to the seat support frame 300; and a track follower arrangement 150. The track follower arrangement 150 is associated with the leg rest.

The track follower arrangement 150 comprises a track following formation 152, and a biasing arrangement 154. The biasing arrangement 154 includes a pivotal member 156 that is pivotally mounted to a base member 155 at axis X-X. The base member 155 is in turn mounted to the leg rest.

Figure 43:
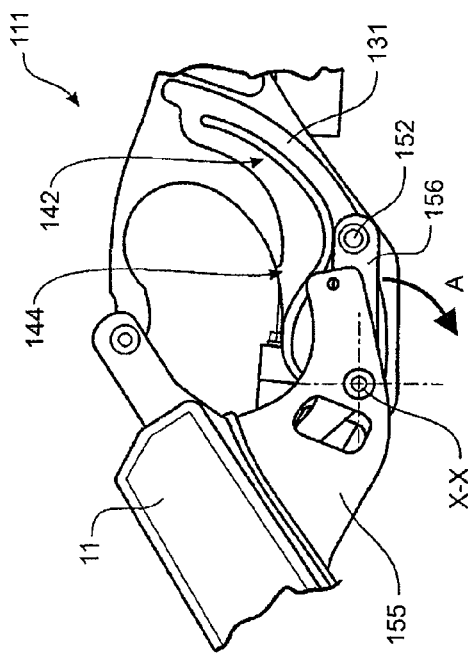
FIGS. 42-45 show a side cutaway view of the horizontal support mechanism of a leg rest mechanism in various positions.
Figure 46:
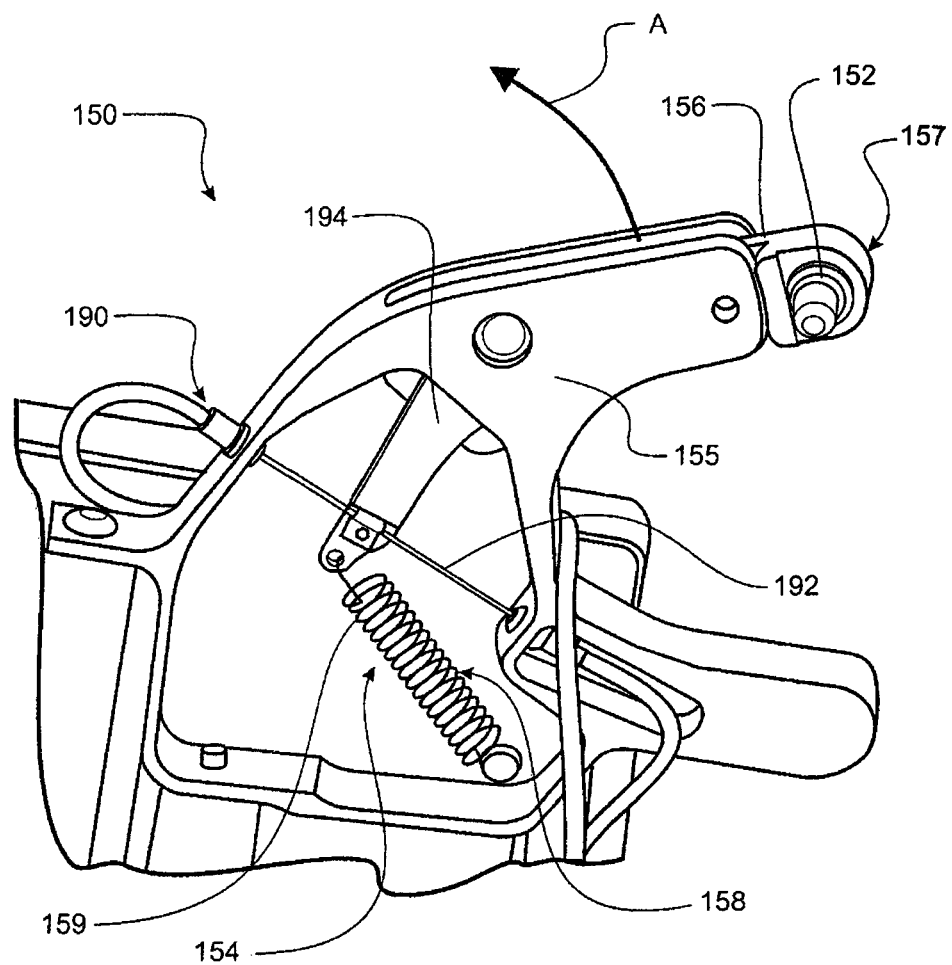
FIG. 46 shows a close-up top perspective cutaway view of a track follower arrangement and synchronisation mechanism.
Figure 47:
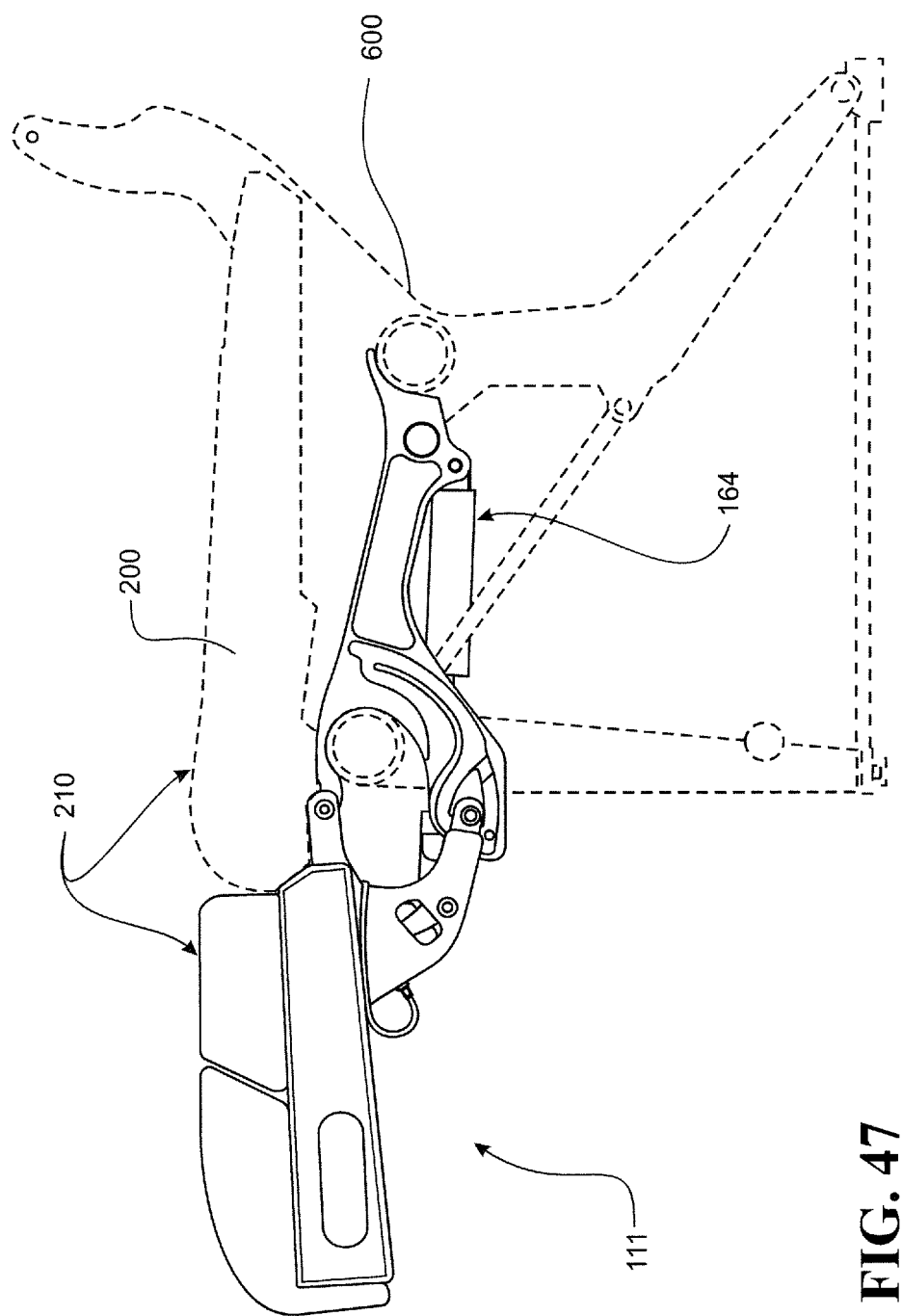
FIG. 47 shows a side view of a leg rest mechanism in a supporting position cooperating with a seat pad of a seat arrangement to define a substantially horizontal surface on which a passenger is supportable.
Figure 48:
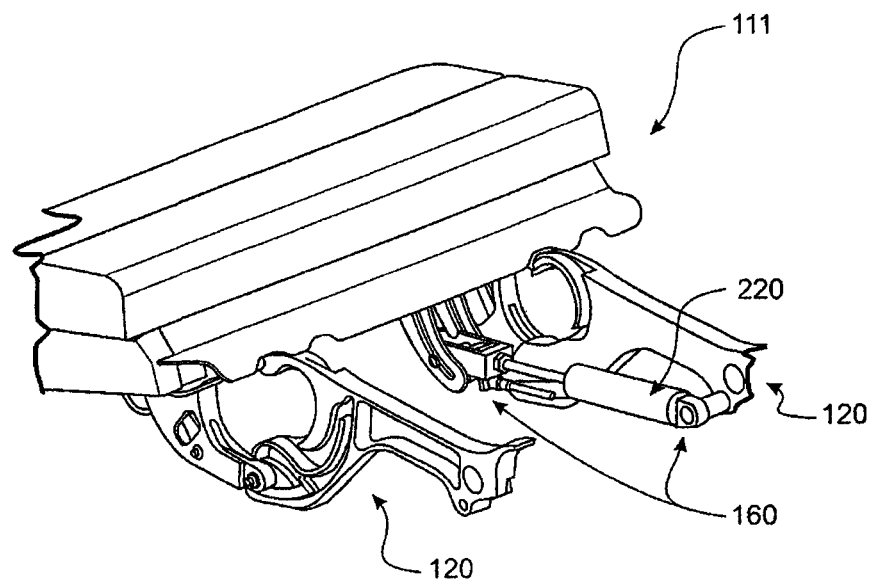
FIG. 48 shows a cutaway top rear perspective view of a leg rest mechanism.

The pivotal member 156 is biased by a spring 159 to pivot about axis X-X relative to the base member 155, so that the pivotal member 156 moves clockwise as shown by arrow A in FIGS. 43 and 46. The track following formation 152 (which acts as a cam follower along cam slot 131) extends from a distal end 157 of the pivotal member 156. In this way, the spring 159 holds the track following formation 152 against the lower edge of the cam slot 131.

Figure 38:
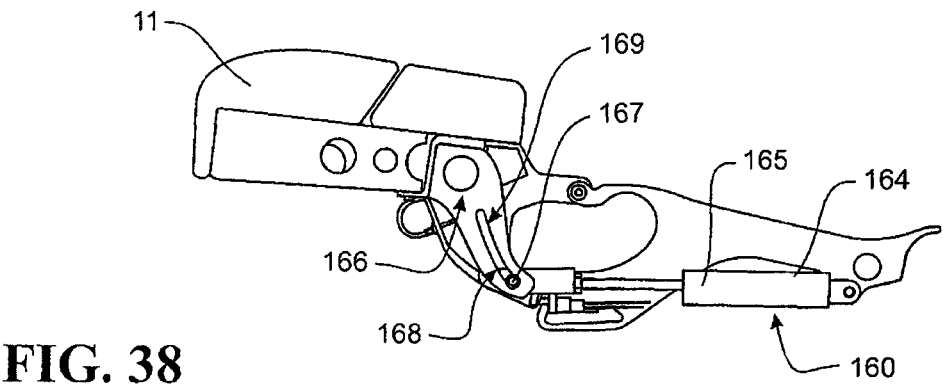
FIG. 38 shows a cutaway side view of a leg rest mechanism showing the adjustable support mechanism.
Figure 39:
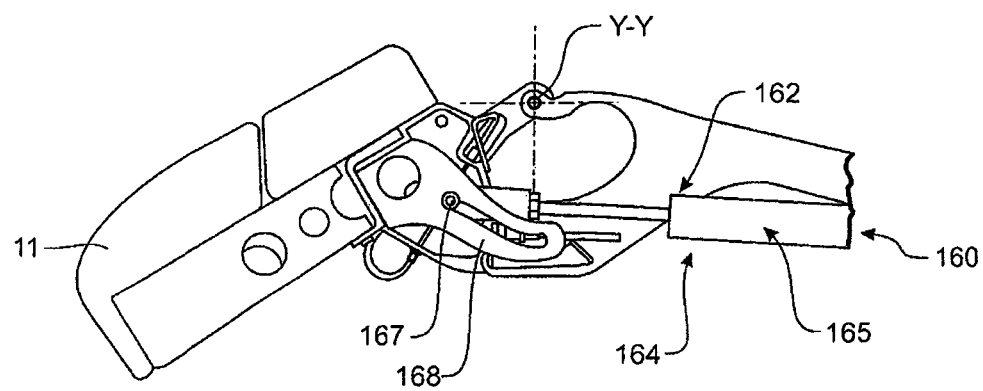
FIG. 39 shows a cutaway side view of a leg rest mechanism showing the adjustable support mechanism.
Figure 40:
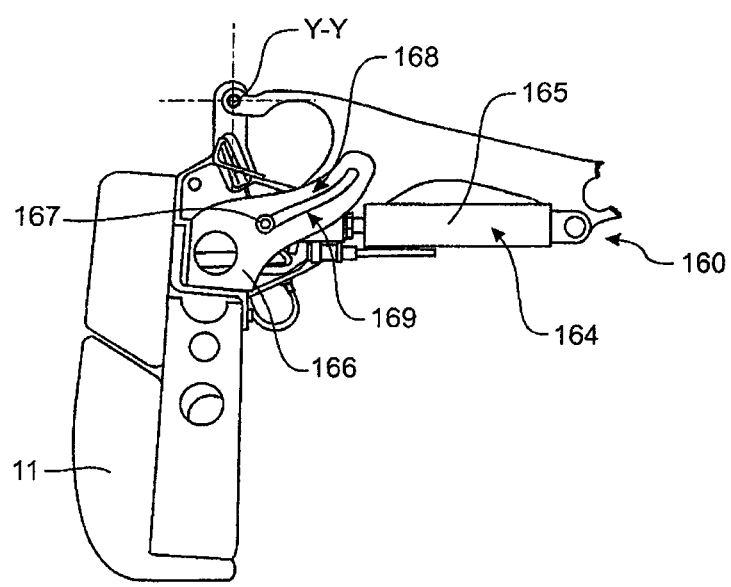
FIG. 40 shows a cutaway side view of a leg rest mechanism showing the adjustable support mechanism.

The adjustable support mechanism 160 is shown in FIGS. 38-40. It includes a locking mechanism 162 in the form of a biased piston and cylinder arrangement 164 such as a hydrolock, and a reaction member 166. In a preferred embodiment, the piston and cylinder arrangement 164 is associated with the seat frame 600, and the reaction member 166 is associated with the leg rest.

The adjustable support mechanism 160 serves to allow the leg rest to be moved to an infinite number of positions between its stowed position and an intermediate position, and locked in those positions. The preferred intermediate position of the support surface of the leg rest is preferably in the range of inclination of between 30 to 70 degrees to the vertical, and most preferably to about 60 degrees to the vertical in the.

In one preferred embodiment, the piston and cylinder arrangement 164 is a "hydrolock" piston and cylinder arrangement. Fluid flow is typically controlled by means of a button or other actuator available to a passenger (such as on the arm rest). Release of the button will result in the position of the leg rest being locked, such as at a position between its stowed position and its intermediate position.

A drive arrangement 220 may be provided. This is provided as a means for moving the leg rest between its stowed position and its intermediate position. It is envisaged that the drive arrangement 220 could be adapted to move the leg rest in both directions between its stowed position and its intermediate position, or in only one direction. In a preferred embodiment, the drive arrangement comprises a spring received within the piston and cylinder arrangement 164 that biases the piston and cylinder arrangement 164 to extend, thereby biasing the leg rest to its intermediate position when the locking mechanism (eg the hydrolock) allows movement of the piston and cylinder arrangement 164.

As shown in FIGS. 38-39, in a preferred embodiment, the adjustable support mechanism 160 allows for lost motion movement between the leg rest and the piston and cylinder arrangement 164 by means of a lost motion arrangement 168.

The lost motion arrangement 168 comprises a pin 167 attached to an end of the piston and cylinder arrangement 164, which is a moveable within a slot 169 in the reaction member 166. However, it is envisaged that a wide variety of lost motion arrangements could be used, including apertures and/or recesses of a wide variety of shapes.

The pin 167 is moveable within the slot 169 between an outer position (as shown in FIGS. 39 and 40) at the forward end of the slot 169, and an inner position (as shown in FIG. 38) at a rearward end of the slot 169.

When the piston and cylinder arrangement 164 extends, the pin 167 moves along the slot 169 to its outer position, after which the pin 167 pushes against the reaction member 166 to pivot the support member about axis Y-Y, thereby causing the movement of the track follower arrangement 150 along the track formation 130 as will be described below.

The piston and cylinder arrangement 164 is biased to extend when the flow of fluid is allowed (by for example the passenger pushing an actuator button—not shown), thereby causing the movement of the pin 167 in the slot 169 to its outer position, and then movement of the leg rest in the direction of arrow B (as shown in FIG. 43) about its axis Y-Y (simultaneously causing movement of the horizontal support mechanism 120 from its stowed position). When the button is released, movement of the piston and cylinder arrangement 164 is stopped, and the leg rest is held in that position.

In the preferred embodiment shown in the figures, the adjustable support mechanism 160 will only push the track follower arrangement 150 in one direction—that direction in which the horizontal support mechanism 120 is reconfigured from the its stowed position to its intermediate position. In the most preferred embodiment, the adjustable support mechanism 160 may also cause movement of the track follower arrangement 150 along the track formation 130 until the horizontal support mechanism 120 is in its intermediate configuration (as shown in FIG. 43), and will then stop. The movement will stop as this is the maximum extension of the piston and cylinder arrangement 164. The intermediate position of the horizontal support mechanism 120 is expected to coincide with a position of the planar support member being in the range of about 30 degrees to 70 degrees to the vertical, and most preferably about 60 degrees to the vertical.

Once the intermediate position is reached, the piston and cylinder arrangement 164 cannot extend further. In this position, the pin 167 of the lost motion arrangement 168 will be in its outer position. If a passenger wants the leg rest to extend further to its fully deployed position, they will be required to grab the leg rest, eg a manual handle 112 to reconfigure the horizontal support mechanism 120 to its fully deployed position.

It is envisaged that when the leg rest is pulled on manually by a passenger to extend the horizontal support mechanism 120 to its fully deployed, the pin 167 of the lost motion arrangement 168 will move towards its inner position along the slot 169. In this way, manual operation is allowable without a passenger having to pull against friction created by the locking mechanism 162.

The track follower arrangement 150 follows the track formation 130 as the leg rest is moved between its stowed position and fully deployed position, through its intermediate position. The track formation 130 and track follower arrangement 150 are moveable relative to each other between a stowed position corresponding to the stowed position of the leg rest, an intermediate position corresponding to the intermediate position of the leg rest, and an extended position corresponding to the fully deployed position of the leg rest.

The track formation 130 defines a terminal end 133 and an endless path 132 at an opposed side of the track formation 130 to the terminal end 133. The endless path 132 further defines a detent formation 134 in the form of a recessed region 163 or U-shaped kink in the cam slot 131. The track follower arrangement 150 is captured by this recessed region 163 when moving along the track formation 130 in one direction. It is envisaged that the track follower arrangement 150 will not be pushed into this recessed region 163 by the drive arrangement 20, as the drive arrangement will operate to only push it to the intermediate position as shown in FIG. 43.

Instead, when a passenger manually pulls the manual handle 112 upwardly, this will cause the track follower arrangement 150 to move along the track formation 130 and into the recessed region 163.

It is envisaged that the leg rest will be require to be pulled upwardly into an overextended position in order for the track following formation 152 to be able to move around the highest point of the endless path 132 before the track following formation 152 is captured in the recessed region 136. When the leg rest is in its overextended position, the relative position of the track formation 130 and track follower arrangement 150 will be in an overextended position.

When the track following formation 152 has traversed over the highest point of the endless path 132, it will move into the recessed region 136 under action of the biasing arrangement 154.

Then when the manual handle 112 is released, the shape of the recessed region 136 of the detent formation 134 prevents the relative movement of the track follower arrangement 150 and track formation 130 back to their intermediate position. The track follower arrangement 150 is captured in the detent formation 134, so that a passenger can put their legs up onto the support member and have their legs supported without fear of it giving way.

The radius from the axis of the support member Y-Y to the axis of the pivotal member x-X-X is similar to radius from the axis of the support member Y-Y to the centre of the circularly shaped track follower arrangement 150. This will prevent pivotal movement of the pivotal member 156 when force is exerted by a passenger on the leg rest.

The detent formation 134 provides a locking mechanism that positively locks the movement of the track follower arrangement 150 in the detent formation 134. The detent formation 134 also co-operates with the biasing arrangement 154 of the track follower arrangement 150, to allow movement of the track follower arrangement along the track formation 130 in one direction only, as will be described below.

Figure 45:
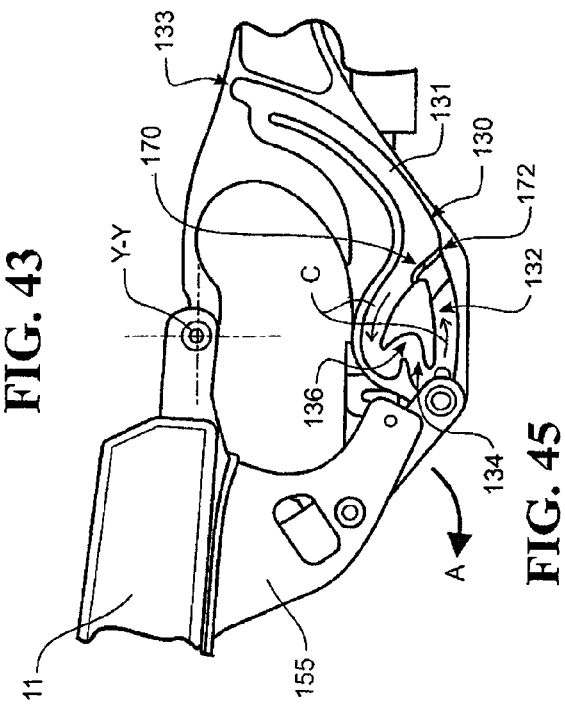

As may be seen in FIG. 45, the cam slot 131 starts at a terminal end 133, and traverses an endless path 132 towards the opposed direction. It traverses in a loop-shape endless path 132 with a recessed region 136 in it (in a U-shape). When the horizontal support mechanism 120 is initially moved from its stowed position, the track following formation 152 starts at the terminal end 133 of the cam slot 131. As the track following formation 152 moves along the cam slot 131, it is prevented from moving in a clockwise direction (the orientation with reference to the drawings) along the endless path by a one way mechanism 170 located along the track formation 130 (as shown on FIG. 44). The one way mechanism 170 comprises a track closure formation 172 that pivots about an axis 174 that is disposed to the top side of the track formation 130.

The track closure formation 172 pivots between a restricted position in which it restricts movement of the track following formation 152 through the cam slot in one direction, and an unrestricted position in which it allows movement of the track following formation 152 along the cam slot 131. The track closure formation 172 is biased to its restricted position by a bias, such as by gravity (as shown in the figures) or under the effect of a spring.

The track closure formation 172 is adapted and configured to be moved by the track following formation 152 to move from its restricted position to its unrestricted position to enable movement of the track following formation 152 along the cam slot 131 when the track follower arrangement moves in one direction shown as arrow C in FIG. 45. However it locks in its restricted position when the track following formation 152 pushes on it from the opposite direction. In this way, the track following formation 152 is pushed upwardly to traverse the endless path in an anti-clockwise direction (as shown on FIG. 45) when being moved from the terminal end 133 of the cam slot 131 towards the endless path 132.

As shown in FIG. 43, the intermediate position of the leg rest corresponds to the track following formation 152 being part of the way along the endless path 132 in the anti-clockwise direction, or just before the endless path 132.

Manual movement of leg rest arrangement by a passenger pulling upwardly on the manual handle 112 results in further movement of the track following formation 152 in the direction of Arrow C.

As the track following formation 152 moves into the recessed region 136, the biasing arrangement 154 of the track follower arrangement 150 will bias the track following formation 152 to move further into the recessed region 136 and stop at the bottom of its U-shape. It should be noted that the shape and configuration of the track formation 130 is specifically designed to follow the path of movement of the track following formation under action of the biasing arrangement 154 at this stage.

In a preferred embodiment, the pair of horizontal support mechanisms 120 include a synchronisation mechanism 190 to ensure that the track following formations 152 of each of the horizontal support mechanisms 120 are in synchronisation with each other at the same location on each of their respective track formations 130.

Each synchronisation mechanism 190 comprises at least one cable 192 securely fastened to a synchronisation lever 194. Each synchronisation lever 194 is secured to the pivotal member 156 to pivot about the same axis X-X.

The cables 192 of each synchronisation mechanisms 190 are connected to each other, so that movement of the pivotal member 156 (and hence synchronisation lever 194) of one results in similar movement of the synchronisation lever 194 of the other. In this way, the situation is prevented, for example, that only one of the track following formations 152 is received into their respective recessed regions 136, while the other remains "jammed" at a highest point on the endless path 132.

According to one aspect of the invention, it is envisaged that the adjustable support mechanism 160 will only power movement of the leg rest between its stowed position and the intermediate position. From this intermediate position, the horizontal support mechanism 120 is only manually moveable to its fully deployed position. In this way injuries to users that may otherwise be caused as a result of powered movement of the horizontal support mechanism 120 to its fully extended position, are avoided.

Further manual reconfiguration by a passenger of the horizontal support mechanism 120 (whether indirectly by applying a lifting force to the leg rest or directly on the horizontal support mechanism 120 itself) will cause the biasing arrangement 154 to move the track following formation 152 to move further along the cam slot 131 in an anti-clockwise direction. It should be noted that the shape of the cam slot 131 is specifically configured and adapted to correspond to the direction of travel of the track following formation 152 under action of the biasing arrangement 154 while the extension arrangement is being lifted by a passenger.

As the track following formation 152 transitions further in the direction of Arrow C about the path 132, it reaches the end of the recessed region 136. At this stage, the passenger is required to push downwardly on the leg rest, to cause the pivotal member 156 to be moved against the bias of the biasing arrangement 154. Further downward pushing will result in the further movement of the track following formation 152 in the direction of Arrow C along the endless path 132 until it reaches the one-way mechanism 170.

At this stage, when the support member is being pivoted downwardly about its axis Y-Y, the pin 167 of the lost motion arrangement is moving towards its inner position in the slot 169. When the inner position is reached, then the piston and cylinder arrangement 164 will need to start retracting. In order to do so, it is envisaged that a passenger may be required to actuate the actuator button to enable movement of the piston and cylinder arrangement 164. Similarly, if other locking mechanisms are used, then it is envisaged that they will be required to be in an unlocked state to allow further movement of the leg rest.

When the track following formation 152 encounters the track closure formation 172 in its restricted position, it will cause the track closure formation 172 to pivot upwardly and out of its way to an unrestricted position. The track following formation 152 then moves through the cam slot 131 in an unrestricted fashion. Once the track following formation 152 has passed the one-way mechanism 170, the track closure formation 172 will fall down behind it under action of gravity, although it is envisaged that a biasing means (not shown) could also be provided to bias the track closure formation to a restricted position.

Further manual pushing on the leg rest, will result in the track following formation 152 moving towards the terminal end 133 of the track formation 130.

Figure 41:
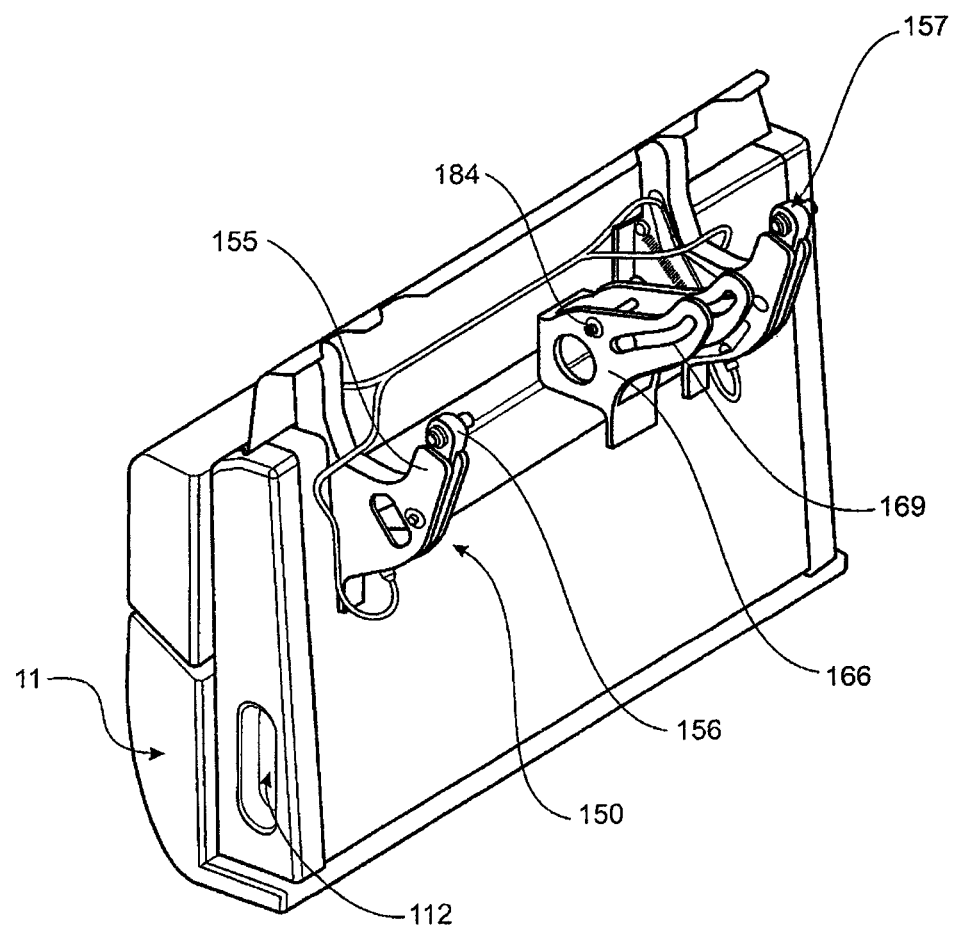
FIG. 41 shows a perspective cutaway view of the support member, track follower arrangements, and reaction member.

It is envisaged that, as the horizontal support mechanism 120 is reconfigured to its stowed position, a latch mechanism (not shown) associated with one or more of the adjustable support mechanism 160 and the horizontal support mechanism 120 will engage, to hold the leg rest in its stowed position until released again by, for example, pressing the actuator button to allow the hydrolock piston and cylinder arrangement 164 to extend under action of its bias as described above. In one embodiment and as shown in FIG. 41, the latch mechanism is in the form of a hook (not shown) and pin 184. The hook (not shown) is associated with the piston and cylinder arrangement 164, and the pin 184 is associated with the reaction member 166, so that if the adjustable support mechanism 160 is reversed to move the horizontal support mechanism 120 to its stowed configuration, the hook will engage with the pin 184 to lock the horizontal support mechanism 120 in its stowed configuration until the adjustable support mechanism is actuated again. Of course it should be noted that the hydrolock piston and cylinder arrangement 164 acts as a latch mechanism itself to hold leg rest in its stowed position.

When the drive arrangement 220 is allowed to move the leg rest from its stowed position to the intermediate position again, the hook will automatically release the pin 184 as the piston and cylinder arrangement 164 extends.

Figure 44:
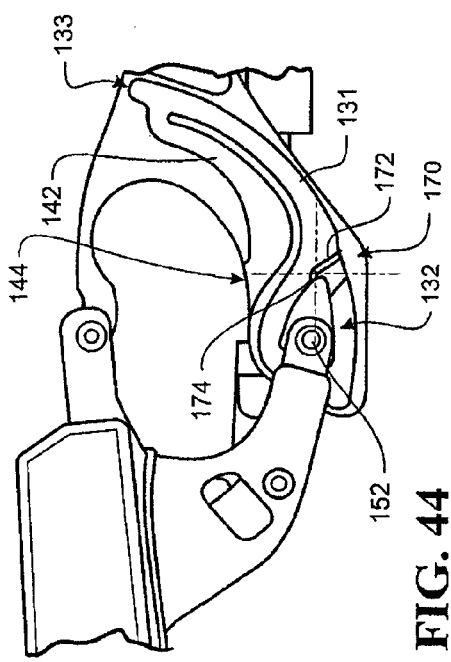

As shown in FIGS. 43 and 44, it is envisaged that the track formation 130 could include a maintenance track formation 142 that will allow the track follower arrangement 10 to be completely disengaged from the track formation for maintenance and access reason. Once disengaged, the leg rest can be pivoted upwardly to extend far past the position that it would be in when the horizontal support mechanism 120 is in its extended position.

Figure 2:
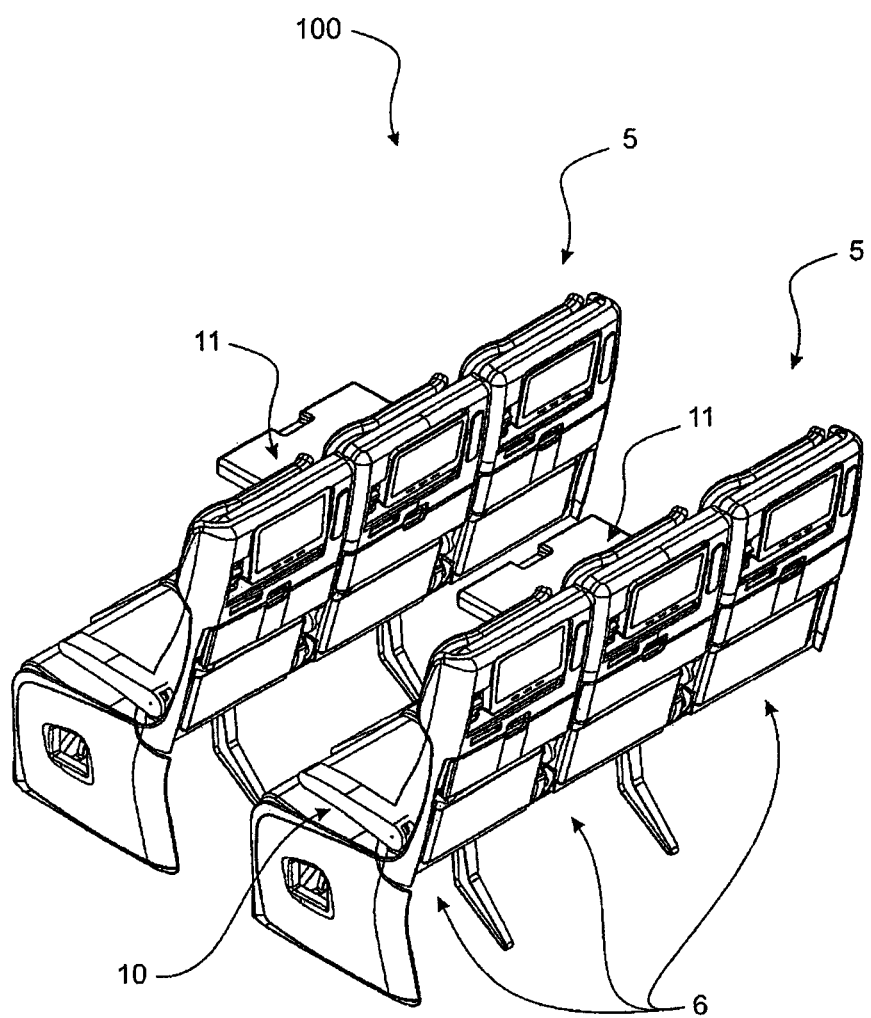
FIG. 2 shows a back perspective view of a seating arrangement of FIG. 1a with individual seats positioned in various configurations.

The maintenance track formation 142 extends from near the terminal end 133 of the track formation 130 to an open end 144. The track following formation 152 can be moved into the maintenance track formation 142 as shown in FIG. 2 by appropriate manipulation of the pivotal member 156.

The leg rest is designed so that the leg rest does not require support from a seat in front, nor from the floor below. The leg rest is supported via the mechanism by the seat to which it is attached.

Whilst herein reference is made to the leg rest and its primary function as being a leg rest to the passenger sitting on the seat pan with which the leg rest is associated, the leg rest may be used in a secondary function such as for allowing a passenger to sit on it or to lie on top of it. Preferably each leg rest can be moved and positioned independently of the other leg rests. Preferably the seat pan of each seat can tilt (preferably in conjunction with a reclining of the back rest) independently of the seat pan of said adjacent seat(s).

A further embodiment of the invention may include at least one tray table 80 that is mounted to the rear of a seat back 12. It provides a surface for an associated passenger seated behind the seat back 12 to use. The tray table 80 can be deployed for use or stowed out of the way when not required. It also has various partially deployed states.

The table comprises a primary table top 82 and a segmented secondary table top 85 comprising multiple extension panels 84 which can be moved to increase or decrease the usable surface area of the tray table 80.

The primary table top 82 is pivotally mounted by an arm 86 or pair of arms 86 that are affixed to the seat, such as to the seat back. The arms define a horizontal pivot axis that mounts the primary table top to be rotational between a stowed position where it is located adjacent and substantially parallel to the seat back and a deployed position for use. The arms may themselves be pivotally mounted to the seatback.

Figure 30:
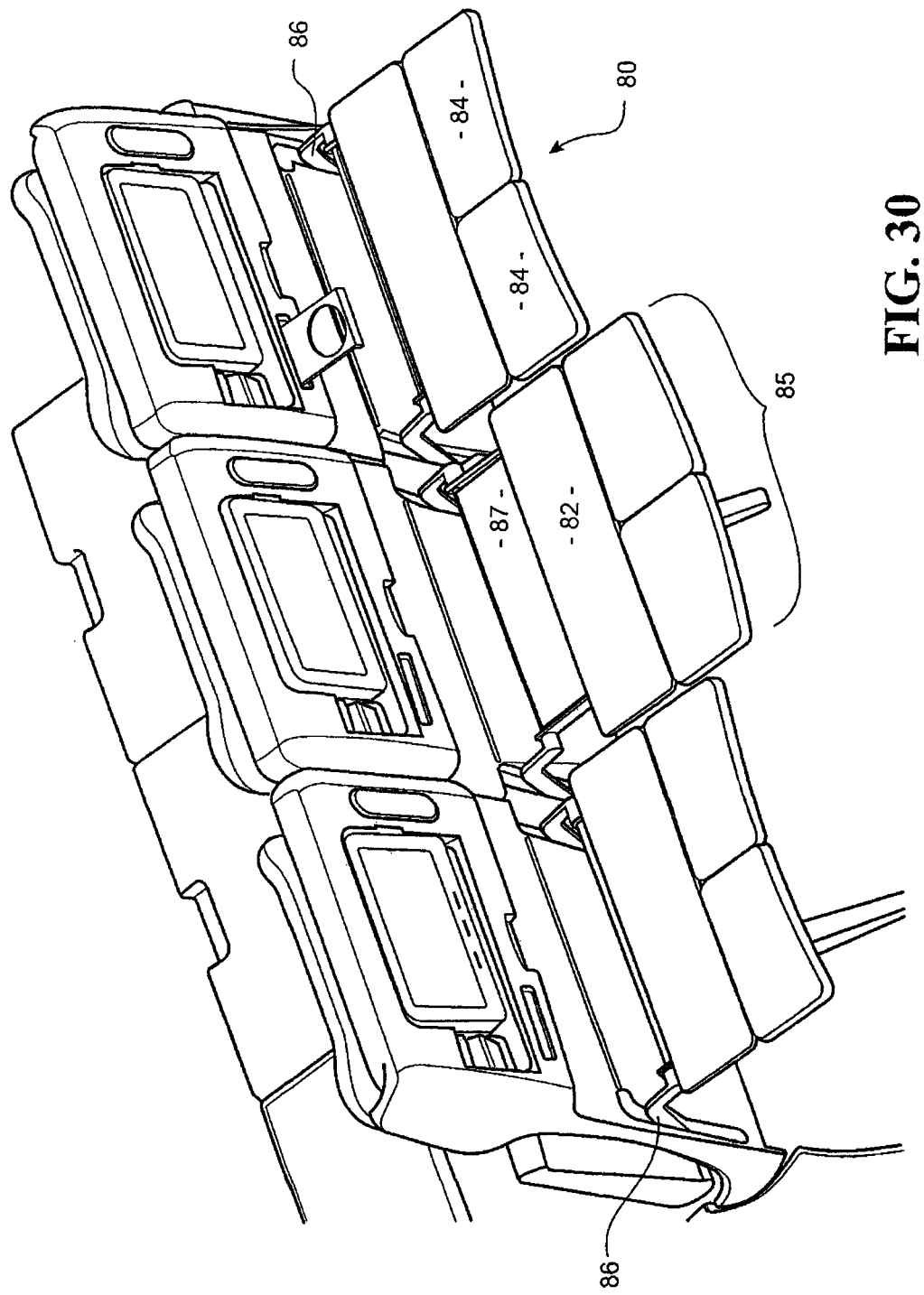
FIG. 30 shows a top perspective view of a plurality of tray tables in another configuration.

It is envisaged that primary table top 82 may be slidably mounted to the base panel 87 as shown in the middle arrangement of FIG. 30. Alternatively there may be no such base panel 87. And the primary table top may be directly connected to the arms 86.

Figure 29:
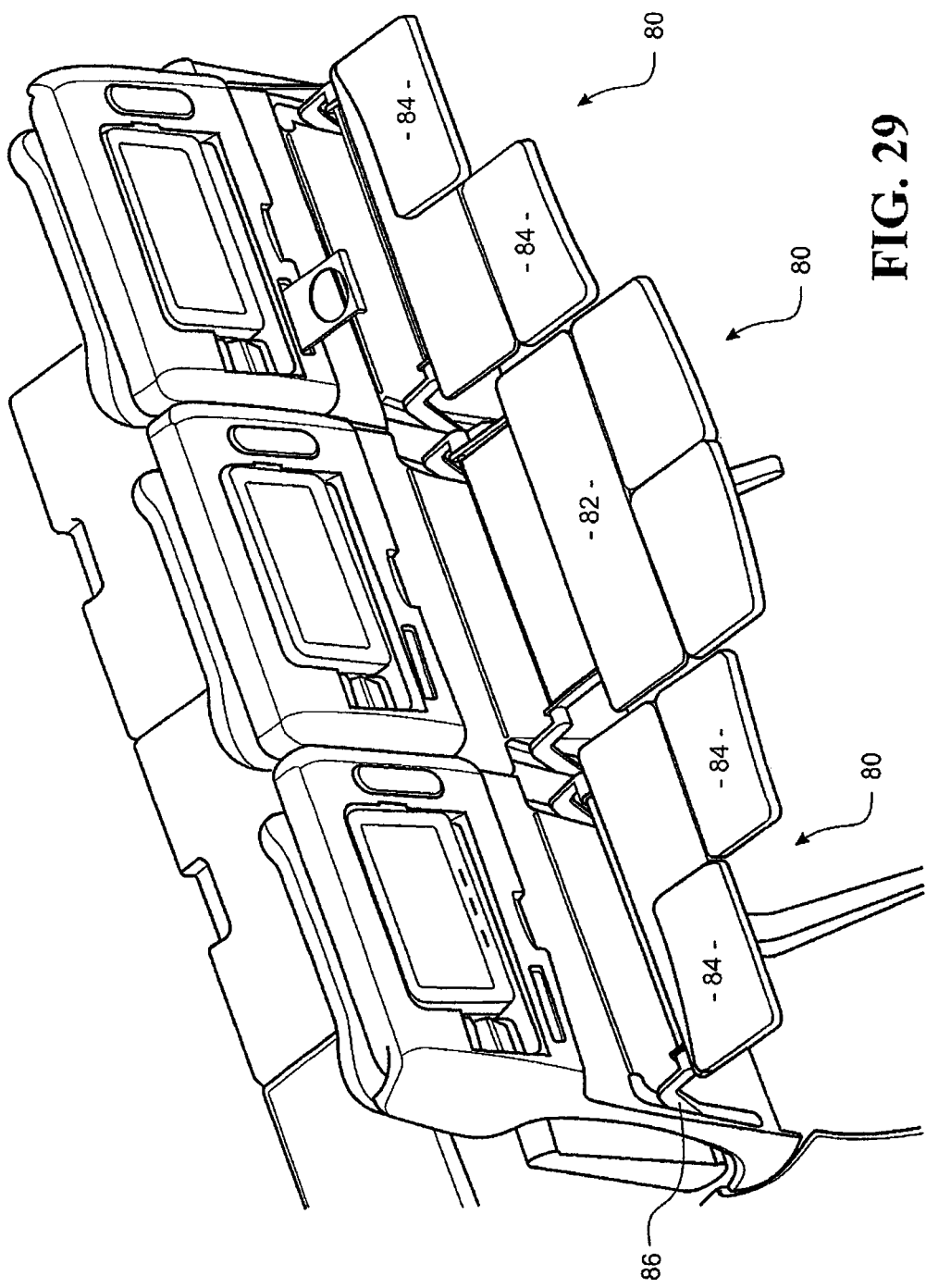
FIG. 29 shows a top perspective view of a plurality of tray tables.

The primary table top carries the segmented secondary table top. This may comprise of two adjacent extension panels 84 that may be pivotally mounted to the primary table top 82. In a preferred embodiment as shown in FIGS. 29 and 30, two pivotally mounted extension panels 84 are pivoted or hinged from the edge of the primary table top 82 closest to the passenger. The two pivotally mounted extension panels 84 are pivotable between a first position in which they are folded together on top of the primary table top 82 such that their major faces are in face to face contact with each other, and a second position, in which either one or both of the pivotally mounted extension panels 84, can be pivoted or hinged from a folded position into a deployed position such that the total table top surface is increased toward the passenger together with the primary table top 82.

Alternatively the pivotally mounted extension panels 84 could hinge from any edge of the primary table top.

The preferred edge of the primary table top that may be utilised is the edge that is perpendicular to the seat facing direction. The primary table top is preferably quadrilateral is shape. And preferably rectangular. The extension panels are preferably also rectangular in shape and each include an edge that can be positioned contiguous the others, such as when both extension panels are fully deployed or both are fully in their stored condition.

In the preferred embodiment two or more tray tables 80 for a row of seats can act in concert to provide various table arrangements for the passengers in the row of seats. It is envisaged that the various available configurations of the tray tables may be used in combination with the many available configurations of the seats as a seating system 500 to provide a high degree of flexibility and usability for passengers of various sizes and groupings, a shown in FIGS. 8-28.

For example, a tray table arrangement for the middle of a row of 3 seats may be fully deployed, the leg rest of that seat being in the stored position to allow a passenger in that seat to be sedentary. Passengers in the adjacent seats may sit on the fully extended leg rests of their respective seats to allow them to sit in a more communal manner with the passenger in the middle seat and utilise the tray table arrangement in desired manner. This can help facilitate more comfortable or desirable interactivity between passengers in a row.

Partially deployed tray table arrangements and tray table arrangements of variable configuration can also help with passenger accessibility and usability of their seating environment.

Figure 31:
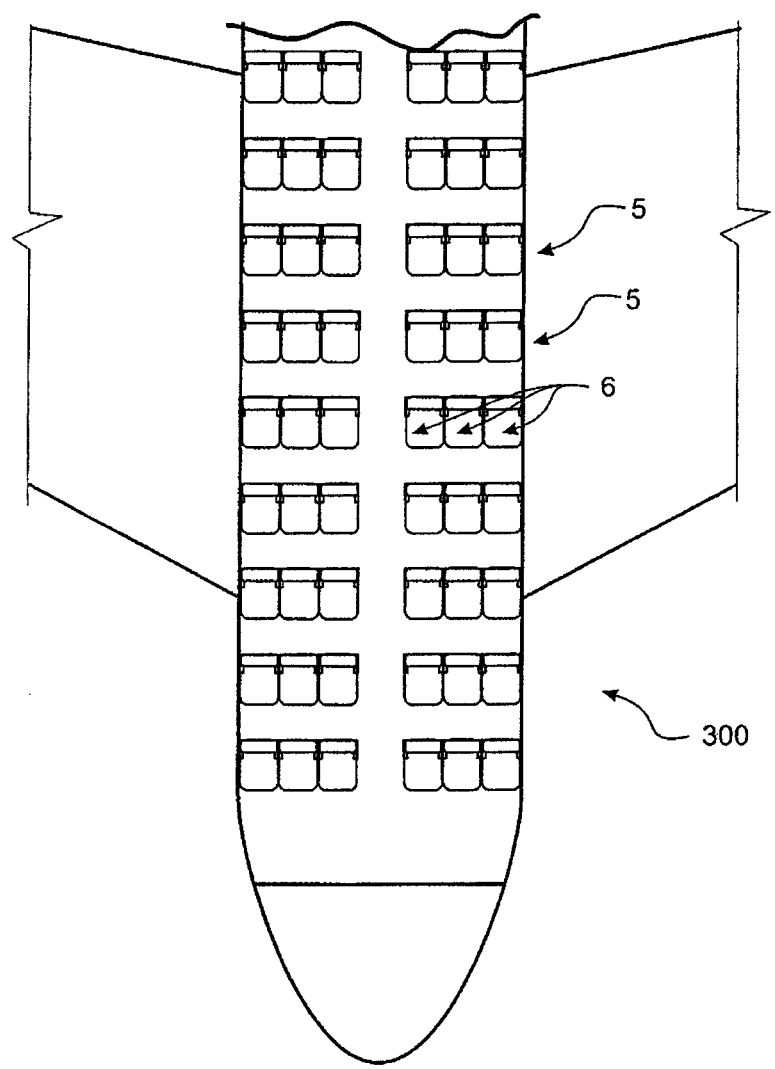
FIG. 31 shows a schematic plan view of part of an aircraft including a plurality of seat units in two columns of rows of seats each with three seats.

As shown in FIG. 31, it is envisaged that an aircraft may include columns (when viewed in plan) of seat units, with the seat units arranged in rows in each column. As an example, the seat units could be arranged in rows of three as two columns separated by an aisle. The rows of each column may align or may be off-set from each other. The rows of each column may have row pitch set at the same pitch or at different pitch. Indeed the pitch between rows in a column, may not be consistent.

Preferably all seats in a row face in a forward direction. The seat facing direction of each seat in a row, and preferably all seats in all rows is perpendicular to the longitudinal direction of the aircraft. Preferably the rows are parallel to each other.

Preferably all seats in the row are no more advanced in the plane compared to other seats in row. Eg the row direction is perpendicular to the longitudinal direction of the aircraft.

Preferably the seats do not rotate about any vertical axis. Eg the seat facing direction remains stationary (i.e. it does not rotate). And preferably the seat frame is stationary.

Figure 32:
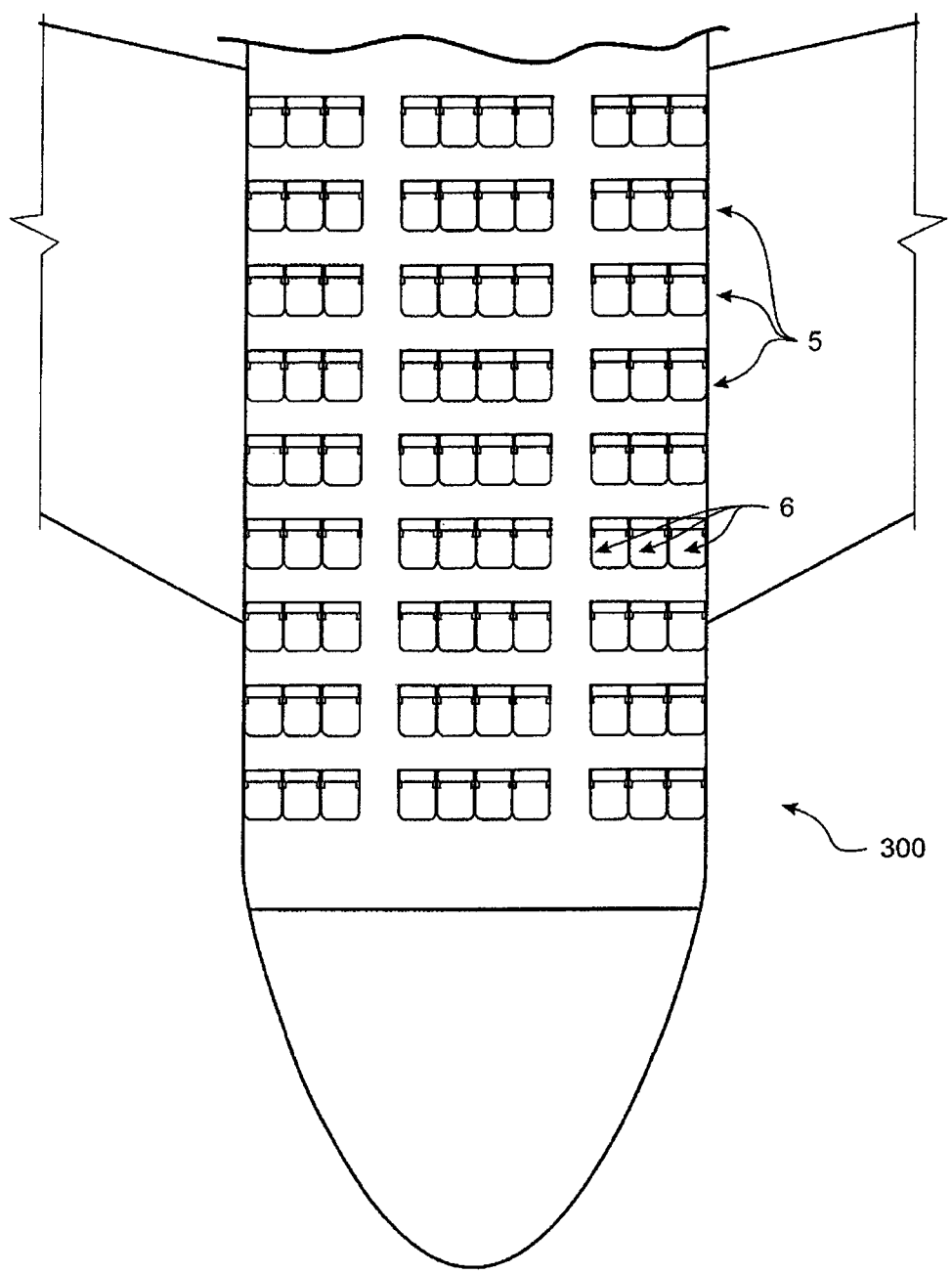
FIG. 32 shows a schematic plan view of an aircraft including a plurality of seat units in two columns of rows of seats with two seats abreast and with an intermediate column of four seats abreast.
Figure 33:
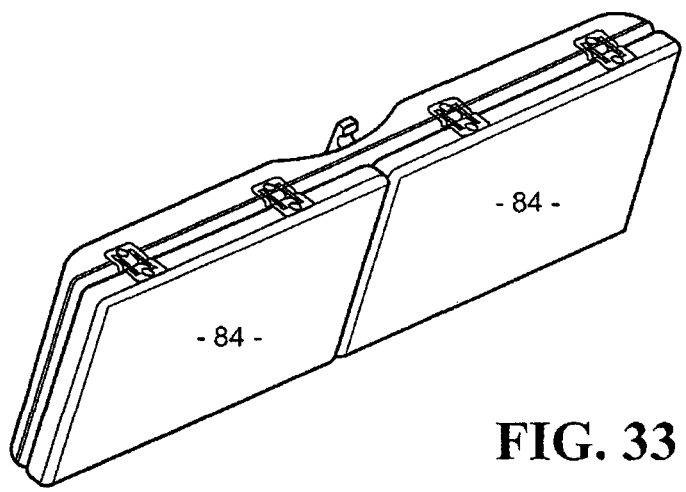
FIG. 33 shows a perspective view of part of a tray table.
Figure 34:
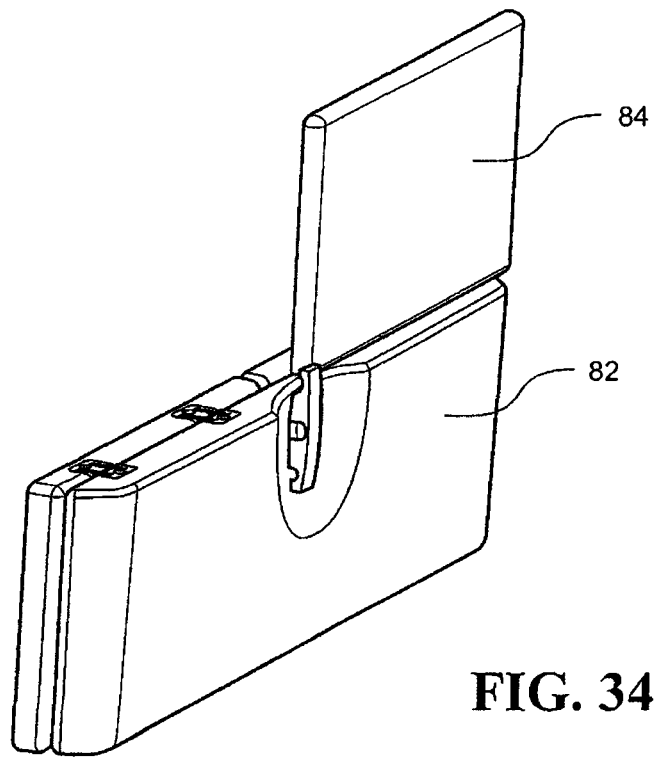
FIG. 34 shows a perspective view of part of a tray table as per FIG. 33 but in a different configuration
Figure 35:
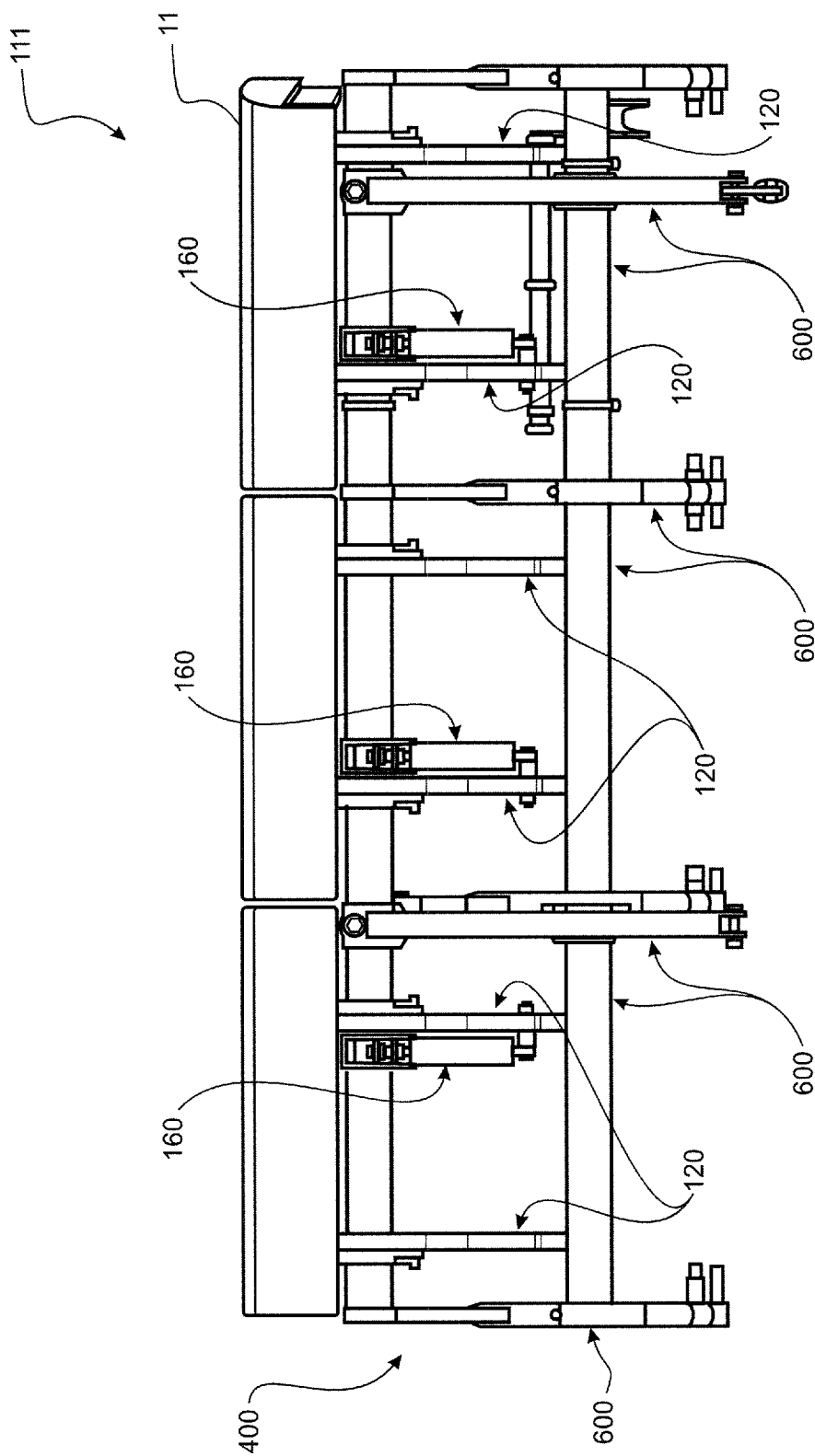
FIG. 35 shows a plan view of leg rest mechanisms each applied to three adjacent seats (with seat pads removed)
Figure 36:
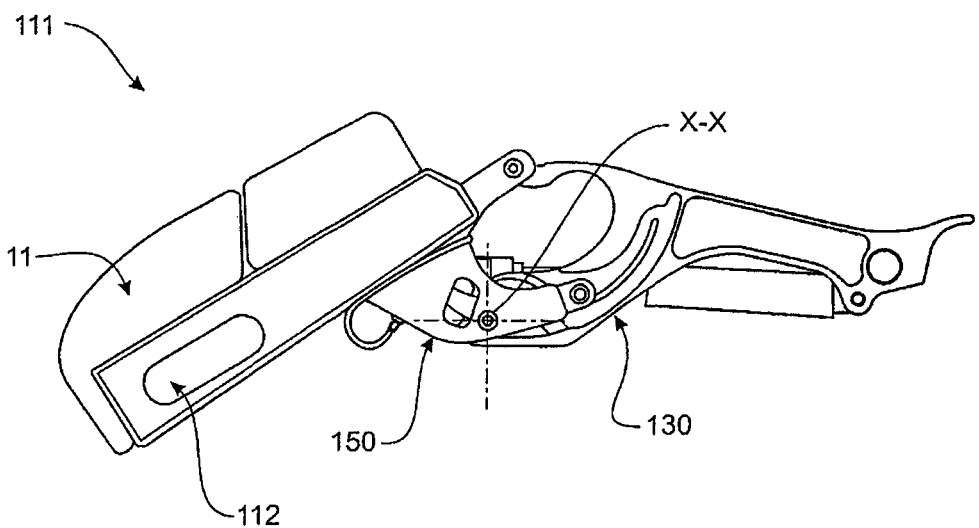
FIG. 36 shows a side view of a leg rest mechanism with the track following formation in a maintenance track for disengagement of the track follower arrangement from the track formation.
Figure 37:
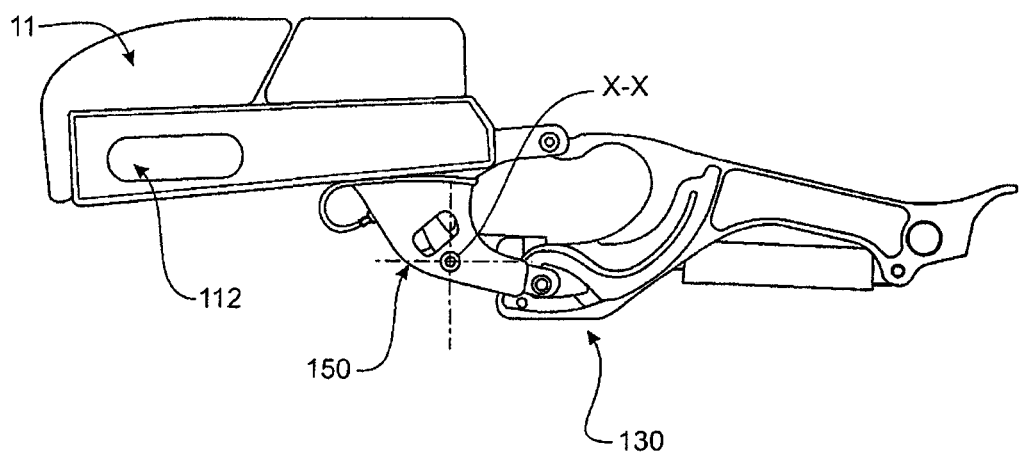
FIG. 37 shows a side view of a leg rest mechanism with the leg rest in its extended position.

In another embodiment for a larger plane, and as shown ion FIG. 32, it is envisaged that two columns of seat units arranged side by side with three-abreast seats in each row of at least one or both columns could be separated by another column of seats with an aisle on each side. The separating column of seats need not be the currently claimed seat units, but may be any known seats. The seats of the present invention lend themselves particularly well for the row being positioned adjacent the interior side wall of the aircraft, where the seats can be arranged to allow a passenger to lean against the cabin wall and thereby create even more space in the row. A person can more conveniently lean against the sidewall of the aircraft when the armrest outboard most is positioned out of the way.

The seat pan of each seat preferably includes an individual seat cushion for each seat. A gap exists between cushions of adjacent seats to allow a seat belt webbing to extend from the seat frame between adjacent cushions. The individual cushions may each and separately be removable. The seat pan of each seat may also tilt independently of the seat pan of adjacent seat(s) in the row. A seat tilt mechanism may be provided so that the angle of incline (in a fore-aft direction) of the cushion may be varied. This mechanism may be tied to the recline mechanism of the back rest of the seat. Eg, as the back rest moves, the seat pan may move.

It is envisaged that the seats are provided in an economy class section of an aircraft.

The accommodation space that can be created by the present invention provides a flexible and multifunctional space that can promote shared use of a defined space by multiple passengers. The space can be configured to treat passengers not as individuals but rather as groups of people such as a couple, a family of three, two business partners, 3 children and so on yet also cater for an individual traveler. And for that individual passenger offer more and multi functional space. Such as when for example the aircraft is not flying at full capacity or full class capacity.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention claimed is:

1. An aircraft seat unit comprising:
a row of a plurality of adjacent seats, each including a support frame, a seat back, a seat pan mounted on the support frame, and a leg rest the leg rest of each seat being moveable relative to the support frame in a manner to allow the leg rest to move between
   (a) a stored condition and
   (b) a fully deployed condition where the seat pan and the leg rest are substantially coplanar, and wherein the leg rest is solely supported by the support frame via at least one support mechanism extending between the support frame and the leg rest for maintaining the leg rest in the fully deployed condition;
wherein in the fully deployed condition, the leg rests of adjacent seats are contiguous with each other,
wherein flanking each side of each seat in the row, is an armrest, the arm rest intermediate of two seats in the row being able to move between a usable position wherein it is positioned intermediate of the seatback and seat pan and a stowed position wherein it is not positioned intermediate of the seatback and seat pan, and
wherein the leg rest and seat pan of each seat in the row can all cooperate to define a reconfigurable horizontal support surface that can be configured to assume each of a T-shape, L-shape and U-shape and I-shape when viewed in plan view and a condition allowing at least two adult passengers assigned to seats in said row to recline on said support surface in a condition where their legs extend in a direction parallel to the row direction.

2. An aircraft seat unit as claimed in claim 1 wherein the row comprises three or four adjacent seats.

3. A passenger vehicle seat unit comprising:
a row of a plurality of adjacent seats, each including a support frame, a seat back, a seat pan mounted on the support frame, and a leg rest, the leg rest of each seat being moveable relative to the support frame in a manner to allow the leg rest to move between
   (a) a stored condition and
   (b) a fully deployed condition where the seat pan and the leg rest are substantially coplanar, and wherein the leg rest is supported by the support frame via at least one support mechanism extending between the support frame and the leg rest for maintaining the leg rest in the fully deployed condition;
wherein in the fully deployed condition, the leg rests of adjacent seats are contiguous with each other,
wherein flanking each side of each seat in the row, is an armrest, the arm rest intermediate of two seats in the row being able to move between a usable position wherein it is positioned intermediate of the seatback and seat pan and a stowed position wherein it is not positioned intermediate of the seatback and seat pan, and
wherein the leg rest and seat pan of each seat in the row can all cooperate to define a reconfigurable horizontal surface to support at least two adult passengers in a reclined or lie-flat position extending in a direction parallel to the row direction and occupy at least two seats of the row.

4. A passenger vehicle seat unit as claimed in claim 3 wherein the row comprises three adjacent seats.

5. A passenger vehicle seat unit as claimed in claim 3 wherein for each seat when in the fully deployed condition, the leg rest extends in a seat facing direction from adjacent the seat pan and is contiguous with the seat pan when in the fully deployed condition.

6. A passenger vehicle seat unit as claimed in claim 3 wherein for each seat when in the stored condition, the leg rest extends in a downward direction from adjacent the seat pan and is contiguous with the seat pan when in the stored condition.

7. A passenger vehicle seat unit as claimed in claim 3 wherein the row includes three seats and wherein all the leg rests and seat pans of said three seats are able to be configured to
   i) define a horizontal passenger support surface that can assume each of a T-shape, L-shape and U-shape and I-shape when viewed in plan view, and
   ii) allow all three leg rests, in their fully deployed condition, together with the seat pans to support at least two adult passengers in a reclined position.

8. A passenger vehicle seat unit as claimed in claim 3 wherein the row includes four seats and wherein all the leg rests and seat pans said four seats are able to be configured to
   iii) define a horizontal passenger support surface that can assume each of a T-shape, L-shape and U-shape and I-shape when viewed in plan view, and
   iv) allow all four leg rests, in their fully deployed condition, together with the seat pans to support at least two adult passengers in a reclined position.

9. A passenger vehicle seat unit as claimed in claim 3 wherein in the stowed position each arm rest intermediate of two adjacent seats, is located in a cavity defined between the backrests of the two adjacent seats.

10. A passenger vehicle seat unit as claimed in claim 3 wherein the arm rest between two adjacent seats, when in said stowed position, is positioned set back from the facing surfaces of the back rests of adjacent seats.

11. A passenger vehicle seat unit as claimed in claim 3 wherein each leg rest can be held in a position intermediate of the fully deployed and stowed conditions.

12. A passenger vehicle seat unit as claimed in claim 3 wherein the support frame supports all seats of said row.

13. A passenger vehicle seat unit as claimed in claim 3 wherein each said leg rest is supported solely by the support frame.

14. A passenger vehicle seating unit as claimed in claim 3 wherein each said leg rest can be moved to and be held at a partially deployed position that is intermediate of the fully deployed and stowed conditions.

15. A passenger vehicle seating unit as claim in claim 3 wherein each leg rest can be moved and positioned independently of the other leg rests.

16. A passenger vehicle seating unit as claimed in claim 3 installed onboard a commercial passenger aircraft.

17. A passenger vehicle seating arrangement comprising:
   i) a first row of a plurality of adjacent seats,
   ii) a second row of a plurality of adjacent seats located adjacent, aligned and in a position advanced more in the vehicle to the first row of seats,
      each seat comprising a support frame, a seat pan mounted on the support frame, a seat back upwardly extending from the seat pan and a leg rest, said leg rest being moveable relative to the support frame to allow it to move between
      (a) a stored condition, and
      (b) a fully deployed condition wherein the leg rest is solely supported by the support frame via at least one support mechanism extending between the support frame and the leg rest for maintaining the leg rest in the fully deployed condition,
      wherein the leg rests, of two adjacent seats in said first row, when in the fully deployed condition, are contiguous with each other, and
      wherein the leg rests of said first row, when all in the fully deployed condition, span between their respective seat pan and the corresponding seat of said second row and together define a surface for two adults to lie or recline on, next to each other in a condition parallel to each other and to the row direction.

18. A passenger vehicle seating arrangement as claimed in 17 wherein for each seat, said leg rest in its stored condition is located adjacent said seat pan and below said seat pan.

19. A passenger vehicle seating arrangement as claimed in claim 17 the leg rest of each seat in a row, when in the fully deployed condition, in cooperation with the respective seat pan, form at least part of a bed for at least two passengers to recline on, generally in a direction perpendicular to the direction parallel to the advanced direction of the vehicle.

20. A passenger vehicle seating arrangement as claimed in claim 17 an armrest is provided at each side of each seat in said first row, at least one of said armrests movable from a position wherein a person sitting in the seat can rest an arm on the armrest and a stored position where the armrest is positioned proximate more and not protruding in a seat facing direction from the adjacent seatback(s).

21. A passenger vehicle seating arrangement as claimed in claim 17 wherein each said leg rest can be set at a position intermediate of the stored condition and fully deployed condition to support the legs of a person on the seat.

22. A passenger vehicle seating arrangement as claimed in claim 17 wherein for any seat in the first row, when its respective leg rest is in a stored condition, there is sufficient room for a person to be able to stand intermediate of said seat and the corresponding seat of the second row, and when in the fully deployed position, there is insufficient room for a person to be able to stand intermediate of said seat and the corresponding seat of the second row.

23. A passenger vehicle seating arrangement as claimed in claim 17 wherein the leg rest of each seat in said first row, when in the fully deployed condition, spans between its respective seat pan and the corresponding seat of said second row.

24. A passenger vehicle seating arrangement as claimed in claim 17 wherein a tray table is dependent from the seat back of each seat of the second row, said tray table comprising
   i) a primary table top, movable between
      a. a stowed position in which it is disposed towards the respective seat, and
      b. a deployed position in which it extends more from the seat and towards the first row, to provide a primary utility surface; and
   ii) a secondary table top, defined by a plurality of adjacent extension panels each individually coupled to the primary table top, wherein the extension panels are disposed in a side by side configuration at at least one edge of the primary panel and can each be moved by a passenger between a stowed condition and a deployed condition where the extension panel projects from the edge of the primary table top and in a co-planar relationship to the primary table top.

25. A passenger vehicle seating arrangement as claimed in claim 24 wherein the primary table top includes an edge extending perpendicular to the advanced direction and the extension panels are disposed at said edge and can be moved closer to or farther from, the first row, corresponding to the deployed and stowed conditions of each respective extension panel.

26. A passenger vehicle seating arrangement as claimed in claim 25 wherein said secondary table top, is of the same width in the row direction as the primary table top.

27. A passenger vehicle seating arrangement as claimed in claim 24 wherein the extension panels are hingingly engaged with the primary table top to rotate relative to the primary table top when moved between the stowed and deployed conditions.

28. A passenger vehicle seating arrangement as claimed in claim 17 wherein the first row of a plurality of adjacent seats is identical to the second row of a plurality of adjacent seats.

29. A passenger vehicle seating unit as claimed in claim 17 installed onboard a commercial passenger aircraft.

30. A passenger vehicle seating arrangement as claimed in claim 17 wherein said first row comprises three or four adjacent seats.

31. A passenger vehicle comprising
(i) a first column of a passenger vehicle seating arrangement comprising at least
   a. first row of a plurality of adjacent seats,
   b. a second row of a plurality of adjacent seats located adjacent, aligned and in a position advanced more in the vehicle to the first row of seats,
   each seat comprising a support frame, a seat pan mounted on the support frame, a seat back upwardly extending from the seat pan and a leg rest, said leg rest being moveable relative to the support frame to allow it to move between
   (a) a stored condition, and
   (b) a fully deployed condition wherein the leg rest is solely supported by the support frame via at least one support mechanism extending between the support frame and the leg rest for maintaining the leg rest in the fully deployed condition,
   wherein the leg rests of two adjacent seats in said first row of said first column, when in the fully deployed condition are contiguous with each other, and
   wherein the seat pans and the leg rests of all the seats in the row can cooperate to provide substantially horizontal passenger support for two adults to lie or recline on and generally extend in a direction parallel to the row direction, and
(ii) a second column of a passenger vehicle seating arrangement parallel to the first column and comprising at least
   a. a first row of a plurality of adjacent seats,
   b. a second row of a plurality of adjacent seats located adjacent, aligned and in a position advanced more in the vehicle to the first row of seats,
   each seat comprising a support frame, a seat pan mounted on the support frame, a seat back upwardly extending from the seat pan and a leg rest, said leg rest being moveable relative to the support frame to allow it to move between
   (a) a stored condition, and
   (b) a fully deployed condition wherein the leg rest is solely supported by the support frame via at least one support mechanism extending between the support frame and the leg rest for maintaining the leg rest in the fully deployed condition,
   wherein the leg rests of two adjacent seats in said first row of said second column, when in the fully deployed condition are contiguous with each other, and
   wherein the seat pans and the leg rests of all the seats in the row can cooperate to provide substantially horizontal passenger support for two adults to lie or recline on and generally extend in a direction parallel to the row direction,
wherein there are two aisles intermediate of said first and second columns, said two aisles separated from each other by a third column of a passenger seating arrangement.

32. A passenger vehicle as claimed in claim 31 wherein each row of seats of said first column includes a window seat and each row of seats of said second column includes a window seat.

33. A passenger vehicle as claimed in claim 31 wherein the rows of seats of the third column comprise seats that do not include a leg rest.

34. A passenger vehicle as claimed in claim 31 wherein the seats of each row of the first and second column, face in a direction parallel to the aisle.

35. A passenger vehicle as claimed in claim 31 that is a commercial passenger aircraft.

36. A passenger vehicle as claimed in claim 31 wherein said first row comprises three or four adjacent seats.

37. A passenger vehicle as claimed in claim 31 wherein the leg rest of each seat in said first row, when in the fully deployed condition, spans between its respective seat pan and the corresponding seat of said second row.

38. A seating arrangement for a passenger aircraft comprising a plurality of side by side and juxtaposed seats each facing in the same direction and aligned with each other forming a row of seats, each seat including a support frame, a seat pan mounted on the support frame, and a leg rest that can be moved relative to the support frame between a stowed condition and a fully deployed condition,
   wherein in the deployed condition the leg rest is solely supported by the support frame via at least one support mechanism extending between the support frame and the leg rest for maintaining the leg rest in the fully deployed condition;
   wherein in the fully deployed condition, the leg rest and seat pan form a horizontal support surface, each said leg rest is of a shape and configuration so that when all leg rests of the row are in a deployed condition they are each contiguous with an adjacent leg rest in the row and contiguous with each respective seat pan, the leg rests of each seat in the row of seats able to be configured in at least one of its deployed and stowed condition to allow two companion adult passengers to each assume (i) a sedentary position by sitting in a respective seat of said row and (ii) at least one of a lounging style position and a reclined position by shared occupation of at least two seats of the row.

39. A seating arrangement as claimed in claim 38 wherein the seating arrangement is in an economy class section of an aircraft.

40. A seating arrangement as claimed in claim 39 wherein each seat also comprises a back rest projecting upwardly from a back edge of said seat pan and wherein in the stowed condition, the leg rest projects downwardly from a front edge of the seat pan and wherein in a deployed condition said leg rest projects from said front edge in a seat facing direction.

41. A seating arrangement as claimed in claim 40 wherein each said leg rest is of a shape and configuration so that when all leg rests of the row are in a deployed condition they offer a resting surface to allow two passengers to lie side by side on the resting surface so formed by the leg rests and the seat pans.

42. A seating arrangement as claimed in claim 38 wherein there are three adjacent seats wherein all the leg rests and seats pans of said three seats are able to be configured to:
  i) define, for at least one person, a horizontal support surface that can assume each of a T-shape, L-shape and U-shape and I-shape when viewed in plan view, and
  ii) allow all three leg rests, in their fully deployed condition, together with the seat pans to support at least two adults in said reclined position.

43. A seating arrangement as claimed in claim 38 wherein there are four adjacent seats wherein all the leg rests and seats pans of said four seats are able to be configured to:
  i) define, for at least one person, a horizontal support surface that can assume each of a T-shape, L-shape and U-shape and I-shape when viewed in plan view, and
  ii) allow all four leg rests, in their fully deployed condition, together with the seat pans to support at least two adults in said reclined position.

44. A passenger vehicle seat arrangement in a passenger vehicle, said arrangement comprising:
  a plurality of rows of seats each seat in each row facing in the same direction, wherein each row comprises:
  a plurality of juxtaposed and in-line seats, each seat including a seat frame supported seat back, seat pan, and leg rest, the leg rest of each seat being moveably mounted relative to the seat frame in a manner to allow the leg rest to move between
  a) a stored condition and
  b) a fully deployed condition wherein the leg rest is solely supported by the seat frame via at least one support mechanism extending between the seat frame and the leg rest for maintaining the leg rest in the fully deployed condition,
  wherein in the fully deployed condition the seat pan and the leg rest are substantially coplanar, the leg rests of adjacent seats are contiguous with each other, and
  wherein the leg rests and seat pans of adjacent seats in the row can cooperate to define a reconfigurable support surface for at least two adult passengers to recline or lie and generally extend in a direction parallel to the row direction, wherein the leg rest of each seat, when in the fully deployed condition is in close proximity to a seat pan of a seat next in front of the row.

45. A passenger vehicle seat arrangement as claimed in claim 44 wherein said proximity is to an extent to prevent a person standing on the floor intermediate of the two rows.

46. A passenger vehicle seat arrangement as claimed in claim 44 wherein each leg rest can be moved and positioned independently of the other leg rests.

47. A passenger vehicle seat arrangement as claimed in claim 44 wherein the row comprises three or four adjacent seats.

48. A passenger vehicle seat arrangement as claimed in claim 44, wherein flanking each side of each seat in the row, is an armrest, the arm rest intermediate of two seats in the row being able to move between a usable position wherein it is positioned intermediate of the seat back and seat pan and a stowed position wherein it is not positioned intermediate of the seat back and seat pan.

49. A passenger accommodation system of a passenger vehicle, said system comprising
  i) a seating arrangement comprising
    a. a first row of a plurality of adjacent seats,
    b. a second row of a plurality of adjacent seats located adjacent, aligned and in a position advanced more in the vehicle to the first row of seats, each seat comprising a seat pan, a seat back upwardly extending from the seat pan and a leg rest, said leg rest mounted relative the seat pan to allow it to move between (a) a stored condition, and (b) a fully deployed condition to allow the leg rests in the row, together with the seat pans, to cooperate to provide substantially horizontal support for at least two adult passengers to recline in a direction parallel to the row direction,
  ii) a tray table located at the back of a backrest of each seat of said second row, said tray table comprising
    a. a primary table top, movable between
      a stowed position in which it is disposed towards the backrest, and
      a deployed position in which it extends generally horizontally and away from the backrest; and
    b. a secondary table top, defined by a plurality of adjacent extension panels each individually coupled to the primary table top, wherein the extension panels are disposed in a side by side configuration at at least one edge of the primary panel and can each be moved by a passenger between a stowed condition and a deployed condition where the extension panel projects from the edge of the primary table top and in a co-planar relationship to the primary table top.

50. A passenger accommodation system as claimed in claim 49, wherein each row comprises three or four adjacent seats.

51. A passenger accommodation system as claimed in claim 49, wherein the leg rest of each seat in said first row, when in the fully deployed condition, spans between its respective seat pan and the corresponding seat of said second row.

52. A method of configuring a passenger resting zone onboard a passenger aircraft, said zone defined at least in part by a row of at least three reconfigurable and adjacent seats, each seat including a support frame, a seat back, a seat pan mounted on the support frame, and a leg rest moveable relative to the support frame in a manner to allow the leg rest to configure to
  a) a stored condition and
  b) an extended condition in which the leg rest is solely supported by the support frame via at least one support mechanism extending between the support frame and the leg rest for maintaining the leg rest in the extended condition, and where the seat pan and the leg rest are substantially coplanar and the leg rest is contiguous with an extended leg rest of an adjacent seat in the row, said method comprising configuring the leg rests of each seat in the row to at least one the following:
    i) a configuration where all the leg rests of the row are in their extended condition such that each leg rest and seat pan of adjacent seats in the row can cooperate to define a horizontal support surface for at least two adult passengers to lie on and extend in a direction parallel to the row direction,
    ii) a configuration wherein only the leg rest of a seat at one end of the row is in the extended condition,
    iii) a configuration wherein each of the leg rests of the seats at each end of the row is in the extended condition,
    iv) a configuration wherein the leg rest of a seat at one end of the row is not in the extended condition, and
    v) a configuration wherein only the leg rest(s) of the seat(s) intermediate of the ends of the row are in the extended condition.

* * * * *